US010035065B2

(12) United States Patent
Schupak et al.

(10) Patent No.: US 10,035,065 B2
(45) Date of Patent: Jul. 31, 2018

(54) GEOGRAPHIC-BASED CONTENT CURATION IN A MULTIPLAYER GAMING ENVIRONMENT

(71) Applicant: Music Social, LLC, New York, NY (US)

(72) Inventors: Nick Schupak, New York, NY (US); Brian Silston, New York, NY (US); Donald Schupak, New York, NY (US)

(73) Assignee: Music Social, LLC, New York, NY (US)

( * ) Notice: Subject to any disclaimer, the term of this patent is extended or adjusted under 35 U.S.C. 154(b) by 0 days.

(21) Appl. No.: 15/436,542

(22) Filed: Feb. 17, 2017

(65) Prior Publication Data

US 2018/0015369 A1    Jan. 18, 2018

Related U.S. Application Data

(60) Provisional application No. 62/296,235, filed on Feb. 17, 2016.

(51) Int. Cl.
| | |
|---|---|
| G06F 17/00 | (2006.01) |
| A63F 13/52 | (2014.01) |
| A63F 13/35 | (2014.01) |
| A63F 13/327 | (2014.01) |
| A63F 13/335 | (2014.01) |

(Continued)

(52) U.S. Cl.
CPC .............. *A63F 13/52* (2014.09); *A63F 13/25* (2014.09); *A63F 13/327* (2014.09); *A63F 13/335* (2014.09); *A63F 13/35* (2014.09); *A63F 13/61* (2014.09); *A63F 13/65* (2014.09); *A63F 13/79* (2014.09); *G06T 11/206* (2013.01); *G06F 3/04817* (2013.01)

(58) Field of Classification Search
None
See application file for complete search history.

(56) References Cited

U.S. PATENT DOCUMENTS

| 8,035,023 B2 | 10/2011 | Hernandez |
| 8,332,402 B2 | 12/2012 | Forstall |

(Continued)

OTHER PUBLICATIONS

Galil et al., VERTIGO: Find, Enjoy and Share Media Trails Across Physical and Social Contexts, 2009.

(Continued)

*Primary Examiner* — Ronald Laneau
(74) *Attorney, Agent, or Firm* — Cooley LLP

(57) ABSTRACT

Systems, apparatus, and methods are disclosed for selecting, distributing, and/or consuming content, including but not limited to recorded speech, written productions, images, recorded music, and video recordings. A multiplayer game based on content curation includes information associated with a graphically simulated multiplayer gaming environment including a plurality of different locations, a plurality of different compositions, a plurality of user profiles, and a plurality of playlists, each electronically linked to a user profile and specifying at least one composition of a plurality of different compositions, a map representing at least a subset of the plurality of different locations and at least one user icon occupying a location of at least the subset of the plurality of different locations based on associated user location information.

25 Claims, 21 Drawing Sheets

(51) Int. Cl.
*A63F 13/25* (2014.01)
*A63F 13/61* (2014.01)
*A63F 13/65* (2014.01)
*G06T 11/20* (2006.01)
*A63F 13/79* (2014.01)
*G06F 3/0481* (2013.01)

(56) References Cited

U.S. PATENT DOCUMENTS

| | | | |
|---|---|---|---|
| 8,332,425 | B2 | 12/2012 | Svendsen |
| 8,346,762 | B2 | 1/2013 | Verosub |
| 8,762,413 | B2 | 6/2014 | Graham, Jr. |
| 8,825,668 | B2 | 9/2014 | Yadav |
| 9,690,540 | B2 * | 6/2017 | Corbin ............... H04L 65/403 |
| 9,723,038 | B2 * | 8/2017 | Corbin ............... H04L 65/403 |
| 9,883,344 | B2 * | 1/2018 | Bolton ............... H04W 4/025 |
| 2004/0225635 | A1 | 11/2004 | Toyama |
| 2006/0143236 | A1 | 6/2006 | Wu |
| 2008/0004734 | A1 | 1/2008 | Li |
| 2008/0294650 | A1 | 11/2008 | Karlsson |
| 2009/0019004 | A1 | 1/2009 | Abhyanker |
| 2009/0328087 | A1 | 12/2009 | Higgins |
| 2010/0010997 | A1 | 1/2010 | Amidon |
| 2010/0114934 | A1 | 5/2010 | Martensson |
| 2010/0228740 | A1 | 9/2010 | Cannistraro |
| 2011/0054646 | A1 | 3/2011 | Hernandez |
| 2011/0124409 | A1 * | 5/2011 | Baynes ............... A63F 13/67 463/30 |
| 2011/0279311 | A1 | 11/2011 | Hamano |
| 2012/0072418 | A1 | 3/2012 | Svendsen |
| 2012/0109345 | A1 | 5/2012 | Gilliland |
| 2012/0221687 | A1 | 8/2012 | Hunter |
| 2013/0246522 | A1 | 9/2013 | Bilinski |
| 2013/0263016 | A1 | 10/2013 | Lehtiniemi |
| 2013/0311452 | A1 | 11/2013 | Jacoby |
| 2014/0031961 | A1 | 1/2014 | Wansley |
| 2014/0281977 | A1 * | 9/2014 | Schupak ............ G06F 3/04817 715/716 |
| 2016/0011750 | A1 * | 1/2016 | Rogers ............... A63F 13/10 463/31 |

OTHER PUBLICATIONS

Office Action for U.S. Appl. No. 13/834,956, dated Oct. 19, 2015.

* cited by examiner

◆ WORLD 👑

BEST PLAYERS

| | | | | | |
|---|---|---|---|---|---|
| 1 | ☺ | Player1 👑 | 20 FOLLOWERS | ◯ | 575 |
| 2 | ☺ | Player2 | 3 FOLLOWERS | ◯ | 450 |
| 3 | ☺ | Player3 | 0 FOLLOWERS | ◯ | 0 |
| 4 | ☺ | Player4 | 0 FOLLOWERS | ◯ | 0 |
| 5 | ☺ | Player5 | 0 FOLLOWERS | ◯ | 0 |
| 6 | ☺ | Player6 | 0 FOLLOWERS | ◯ | 0 |
| 7 | ☺ | Player7 | 0 FOLLOWERS | ◯ | 0 |
| 8 | ☺ | Player8 | 0 FOLLOWERS | ◯ | 0 |
| 9 | ☺ | Player9 | 0 FOLLOWERS | ◯ | 0 |
| 10 | ☺ | Player10 | 0 FOLLOWERS | ◯ | 0 |

🔍       JOIN   LOGIN

🔍 char

HOMES    PLAYLISTS    PLAYERS    SONGS

| | | | |
|---|---|---|---|
| ☺ | Player11 | 1 FOLLOWERS | 508 POINTS |
| ☺ | Player2 | 21 FOLLOWERS | 5637 POINTS |
| ☺ | Player12 | 0 FOLLOWERS | 0 POINTS |
| ☺ | Player13 | 0 FOLLOWERS | 0 POINTS |
| ☺ | Player14 | 1 FOLLOWERS | 45 POINTS |
| ☺ | Player15 | 0 FOLLOWERS | 0 POINTS |
| ☺ | Player16 | 0 FOLLOWERS | 0 POINTS |

| Playlist Title (User 1) — 950 points | | | |
|---|---|---|---|
| Song 1 — added by User 1 | ADD + | Play ▶ | 307 points |
| Song 2 — added by User 1 | ADD + | Play ▶ | 12 points |
| Song 3 — added by User 2 | ADD + | Play ▶ | 3 points |
| (Listen) (Like) (Follow) | | | (last updated 3 days ago) |

FIG. 19

| Station Created by 😊 Player 2 | | ⬡ 1565 POINTS |
|---|---|---|
| PLAYLISTS | | |
| ‹ | Playlist 5<br>Genre: Rock | All Motor › |
| ▶+ PLAY ALL    9 SONGS    MIN UPDATED    4 MONTHS AGO | | |
| ▶ Lets get it on<br>MARVIN GAYE | | ⬡ 275 |
| ▶ under control<br>THE STROKES | | ⬡ 400 |

○ 5637 POINTS    # 17036.4 PAPER

ITEMS PERFORMANCE                    SEE ACTIVE ITEMS

Point amplifier expired on your station.
Power        Estimated Paper Earned
+245%        0

Point siphon expired on Playlist1.
Damage       Estimated Paper Earned
31%          0

Point siphon expired on Playlist 2.
Damage       Estimated Paper Earned
60%          0

Point siphon expired on Playlist1.
Damage       Estimated Paper Earned
52%          0

Pushed composition expired on Station 1 by Player 4.
Estimated Paper Earned   0

2600 — Recommendations 4
- Artic Monkeys - The Lovers — from costica_cos — 60
- "Old English"ft. Young Thug, Fr... from hildegard — 0
- "I Don't Like" G.O.O.D.Music Re... :i DON'T LIKE G.O.O.D.MUSIC R.... from hildegard — 0
- Keep in The Dark (Live) TEMPLES from TeamRocket — 0

2602 — PLAY ALL   13 SONGS MIN   UPDATED  4 MONTHS AGO
- Reptilia — THE STROKES — 151
- (14) 40' — FRANZ FERDINAND @ PARAGUAY — 0
- I Cut Like a Buffalo — THE DEAD WEATHER — 72
- Peter Bjorn and John vs Diplo (yo... — PETER BJORN AND JOHN VS DIPLO (YOUN... — 36
- Neighborhood #1 (Tunnels)

GEOGRAPHIC-BASED CONTENT CURATION IN A MULTIPLAYER GAMING ENVIRONMENT

CROSS-REFERENCES TO RELATED APPLICATIONS

The present application claims a priority benefit, under 35 U.S.C. § 119(e), to U.S. provisional application Ser. No. 62/296,235, filed Feb. 17, 2016, entitled "GEOGRAPHIC-BASED CONTENT CURATION IN A MULTIPLAYER GAMING ENVIRONMENT." The entirety of this provisional application is hereby incorporated herein by reference.

TECHNICAL FIELD

The present disclosure relates generally to systems, apparatus, and methods for selecting, distributing, and/or consuming content over a network. More specifically, the present disclosure relates to systems, apparatus, and methods for a user to compete with, recommend to, market to, and/or otherwise interact with other users over a network using information and experiences directed toward an end-user or audience

BACKGROUND

In publishing, art, and communication, content includes information and experiences intended for an end-user, including but not limited to speech, writing, images, music, and video. While content may be delivered via numerous media, the selection and distribution of content from author to end-user historically has been controlled by relatively few sources deemed reputable. For example, music producers, record labels, and radio syndicates may be considered gatekeepers of the music industry, controlling who hears what, when, where, and/or how. Similarly, major publishing houses, editors, and literary agents have traditionally controlled publication of written works. With the advent of the Internet, however, the selection, distribution, and consumption of content of all kinds quickly evolved, making primary sources of content more readily available and reducing reliance on reputable sources.

SUMMARY

Even though authors and end-users now have more ways available than ever before to share content, the inventors have recognized and appreciated that a desire remains among authors and end-users to interact with each other through music in more personal and social ways, both locally and globally. The inventors also recognized and appreciated that computer and video games are increasingly an outlet for personal expression and social experience. In particular, multiplayer games allow users not only to interact with a user interface to generate feedback on a display associated with an electronic system, but also to interact with other users competitively or cooperatively by, for example, using a hotseat mode, multiple input devices coupled with the electronic system, and/or networking technologies that interconnect electronic systems.

In one embodiment, a server for processing a multiplayer game based on content curation includes at least one communication interface for communicating information with at least one user device, the information associated with a graphically simulated multiplayer gaming environment including a plurality of different locations and a plurality of different compositions. The server also includes at least one memory for storing processor-executable instructions, a plurality of user profiles to be used in the graphically simulated multiplayer gaming environment, each user profile generated from a user profile generation request having associated user location information, and a plurality of playlists to be shared in the graphically simulated multiplayer gaming environment, each playlist generated from a playlist generation request having associated user profile information and associated playlist composition information such that each playlist is electronically linked to a user profile based on the associated user profile information and specifies at least one composition of a plurality of different compositions based on the associated playlist composition information. The server further includes at least one processor, the at least one processor being communicatively coupled to the at least one communication interface and the at least one memory, wherein upon execution of the processor-executable instructions by the at least one processor, the at least one processor generates a first graphical display including a map representing at least a subset of the plurality of different locations and at least one user icon, each user icon occupying a location of at least the subset of the plurality of different locations based on the associated user location information and electronically linking the first graphical display to a corresponding user profile of the plurality of user profiles and any corresponding playlists of the plurality of playlists based on the associated user profile information, and transmits, via the at least one communication interface, information associated with the first graphical display to the at least one user device.

In an embodiment, the at least one processor further assigns an amount of points to a first user profile of the plurality of user profiles, the amount of points based on at least one of (A) a selection of at least one composition specified in at least one playlist electronically linked to the first user profile, (B) a deselection of the at least one composition specified in the at least one playlist electronically linked to the first user profile, (C) a copy operation to specify at least one composition from at least one playlist electronically linked to the first user profile in a different playlist electronically linked to a different user profile of the plurality of user profiles, and (D) a recommendation command by the first user profile.

In an embodiment, the at least one processor further ranks at least a subset of the plurality of user profiles in at least a subset of the plurality of different locations based on an amount of points assigned to each user profile relative to the total amount of points assigned to at least the subset of the plurality of user profiles.

In an embodiment, a graphical property of a user icon is determined based on an amount of points assigned to the corresponding user profile, the property being at least one of a size, a shape, and a color of the user icon.

In an embodiment, the at least one processor further ranks at least a subset of the plurality of different compositions in at least a subset of the plurality of different locations based on at least one of (A) a number of composition selections by the at least one user device of each composition relative to the total amount of composition selections by the at least one user device of at least the subset of the plurality of different compositions, (B) a number of composition deselections by the at least one user device of each composition relative to the total amount of composition deselections by the at least one user device of at least the subset of the plurality of different compositions, (C) a number of composition copy operations by the at least one user device to specify each composition from a first playlist electronically linked to a first user profile of the plurality of user profiles in a different playlist electronically linked to a different user profile of the plurality of user profiles, and (D) a number of recommendation commands by the at least one user device to recommend each composition.

In an embodiment, the associated user location information is determined automatically from at least one of an Internet Protocol (IP) address, a Media Access Control (MAC) address, a radio-frequency identification (RFID), a Wi-Fi connection location, a satellite navigation position, a Cell ID, and credit card information.

In an embodiment, the at least one processor further receives, via the at least one communication interface, a new user profile generation request from a user device, the new user profile generation request identifying a new user profile to be used in the graphically simulated multiplayer gaming environment, the new user profile generation request having the associated user location information, generates and stores, in the at least one memory, the new user profile, generates a second graphical display including a new user icon occupying a location of the plurality of different locations based on the associated user location information, the new user icon electronically linking the second graphical display to the new user profile, and transmits, via the at least one communication interface, information associated with the second graphical display to the at least one user device.

In an embodiment, the at least one processor further receives, via the at least one communication interface, a new playlist generation request from a user device, the new playlist generation request identifying a new playlist to be shared in the graphically simulated multiplayer gaming environment, the new playlist generation request having the associated user profile information and the associated playlist composition information, generates and stores, in the at least one memory, the new playlist specifying at least one composition of the plurality of different compositions based on the associated playlist composition information, generates a second graphical display including an indication of the new playlist electronically linking the second graphical display to the new playlist, and transmits, via the at least one communication interface, information associated with the second graphical display to the at least one user.

In an embodiment, the playlist generation request has associated playlist genre information. Each playlist may specify from about five compositions to about fifty compositions.

In an embodiment, the at least one processor further receives, via the at least one communication interface, a map navigation command indicating that a user device has selected at least a portion of the plurality of different locations on the map, generates a second graphical display including at least the portion of the plurality of different locations on the map, and transmits, via the at least one communication interface, information associated with the second graphical display to the user device. The second graphical display may depict at least one of a different level of focus and a different subset of locations than the first graphical display.

In an embodiment, the at least one processor further receives, via the at least one communication interface, a spin request from a user device, the spin request identifying at least one of a content category input and a geographical input, generates and stores, in the at least one memory, a spin playlist specifying at least one composition of the plurality of different compositions based on at least one of the content category input and the geographical input, generates a second graphical display including an indication of the spin playlist electronically linking the second graphical display to the spin playlist, and transmits, via the at least one communication interface, information associated with the second graphical display to the at least one user.

In an embodiment, the at least one processor further receives, via the at least one communication interface, a user icon selection command indicating that a user device has selected a first user icon electronically linking the first graphical display to a first user profile of the plurality of user profiles, generates a second graphical display including a first graphical indication electronically linking the second graphical display to a first playlist electronically linked to the first user profile, and transmits, via the at least one communication interface, information associated with the second graphical display to the user device.

In an embodiment, the at least one processor further receives, via the at least one communication interface, a playlist selection command indicating that the user device has selected the first graphical indication electronically linking the second graphical display to the first playlist electronically linked to the first user profile of the plurality of user profiles, generates a third graphical display including a second graphical indication electronically linking the third graphical display to a first composition specified by the first playlist electronically linked to the first user profile, and transmits, via the at least one communication interface, information associated with the third graphical display to the user device.

In an embodiment, the at least one processor further receives, via the at least one communication interface, a recommendation command indicating that the user device associated with a second user profile has recommended a composition for the first playlist electronically linked to the first user profile of the plurality of user profiles, assigns an amount of points to the second user profile based on the recommendation command, generates a fourth graphical display including a third graphical indication electronically linking the fourth graphical display to the recommended composition, and transmits, via the at least one communication interface, information associated with the fourth graphical display to the user device.

In an embodiment, the at least one processor further receives, via the at least one communication interface, at least one of (A) a composition selection command indicating that the user device has selected the second graphical indication electronically linking the third graphical display to the first composition specified by the first playlist electronically linked to the first user profile, (B) a composition deselection command indicating that the user device has deselected the second graphical indication electronically linking the third graphical display to the first composition specified by the first playlist electronically linked to the first user profile, and (C) a composition copy command indicating that the user device has specified the first composition in a second playlist electronically linked to a second user profile. The at least one processor also assigns an amount of points to the first user profile based on the at least one of (A), (B), and (C).

In an embodiment, the at least one processor further receives, via the at least one communication interface, a point amplifier command indicating that a user device has electronically linked a point amplifier to a user profile, the point amplifier specifying a time period after which the electronic link expires, and if an amount of points is to be assigned to the user profile during the time period, assigns an amplified amount of the amount of points to the user profile. The time period may be random and/or predetermined.

In an embodiment, the at least one processor further receives, via the at least one communication interface, a composition push command indicating that a user device associated with a first user profile of the plurality of user profiles has pushed a composition into a playlist electronically linked to a second user profile such that the playlist specifies the composition for a time period, if an amount of points is to be assigned to the second user profile based on the composition during the time period, assigns a first portion of the amount of points to the first user profile and a second portion of the amount of points to the second user profile. The time period may be random and/or predetermined.

In an embodiment, the at least one processor further receives, via the at least one communication interface, a point siphon command indicating that a user device associated with a first user profile of the plurality of user profiles has electronically linked a point siphon to a second user profile, the point siphon specifying a time period after which the electronic link expires, and if an amount of points is to be assigned to the second user profile during the time period, assigns the amount of points to the first user profile and no points to the second user profile. The time period may be random and/or predetermined.

In an embodiment, the at least one processor further receives, via the at least one communication interface, a shield command indicating that a user device associated with a first user profile of the plurality of user profiles has electronically linked a shield to the first user profile, the shield specifying a time period after which the electronic link expires, and if an amount of points is to be assigned to the first user profile during the time period, assigns the full amount of points to the first user profile. The time period may be random and/or predetermined.

In one embodiment, an apparatus for playing a multiplayer game based on content curation includes at least one communication interface for communicating information with at least one server, the information associated with a graphically simulated multiplayer gaming environment including a plurality of different locations and a plurality of different compositions. The apparatus also includes at least one output device for displaying content to a user, at least one input device for receiving input from the user, at least one memory for storing processor-executable instructions; and at least one processor, the at least one processor being communicatively coupled to the at least communication interface, the at least one output device, the at least one input device, and the at least one memory. Upon execution of the processor-executable instructions by the at least one processor, the at least one processor receives from the at least one server, via the at least one communication interface, information associated with a first graphical display including a map representing at least a subset of the plurality of different locations and at least one user icon. Each user icon occupies a location of at least the subset of the plurality of different locations based on one user profile of a plurality of user profiles to be used in the graphically simulated multiplayer gaming environment, each user profile generated from a user profile generation request having associated user location information. Each user icon also electronically links the first graphical display to the one user profile and any corresponding playlists generated from a playlist generation request having associated user profile information and associated playlist composition information such that each corresponding playlist is electronically linked to the one user profile based on the associated user profile information and specifies at least one composition of a plurality of different compositions based on the associated playlist composition information. The at least one processor displays to the user, via the at least one output device, the first graphical display such that the user may select, via the at least one input device, the at least one user icon.

In an embodiment, the apparatus is associated with at least one of a first user profile of the plurality of user profiles, an amount of points assigned to the first user profile, and a ranking based on the amount of points assigned to the first user profile relative to a total amount of points assigned to at least a subset of the plurality of user profiles.

In an embodiment, the amount of points assigned to the first user profile of the plurality of user profiles is based on at least one of (A) a selection of at least one composition specified in at least one playlist electronically linked to the first user profile, (B) a deselection of the at least one composition specified in the at least one playlist electronically linked to the first user profile, (C) a copy operation to specify the at least one composition from at least one playlist electronically linked to the first user profile in a different playlist electronically linked to a different user profile of the plurality of user profiles, and (D) a recommendation command to recommend at least one composition to another user profile. A graphical property of the at least one user icon, displayed via the at least one output device, may indicate an amount of points assigned to the corresponding user profile, the graphical property being at least one of a size, a shape, and a color.

In an embodiment, the at least one processor further provides, via the at least one communication interface, at least one of an Internet Protocol (IP) address, a Media Access Control (MAC) address, a radio-frequency identification (RFID), a Wi-Fi connection location, a satellite navigation position, a Cell ID, and credit card information for automatically determining the associated user location information.

In an embodiment, the at least one processor further transmits, via the at least one communication interface, a new user profile generation request, the new user profile generation request identifying a new user profile to be used in the graphically simulated multiplayer gaming environment, the new user profile generation request having the associated user location information, receives, via the at least one communication interface, information associated with a second graphical display including a new user icon occupying a location of the plurality of different locations based on the associated user location information, the new user icon electronically linking the second graphical display to the new user profile, and displays to the user, via the at least one output device, the second graphical display such that the user may select, via the at least one input device, the new user icon.

In an embodiment, the at least one processor further transmits, via the at least one communication interface, a new playlist generation request identifying a new playlist to be used in the graphically simulated multiplayer gaming environment, the new playlist generation request having the associated user profile information and the associated playlist composition information, receives, via the at least one communication interface, information associated with a second graphical display including an indication of the new playlist electronically linking the second graphical display to the new playlist, and displays, via the at least one output device, the second graphical display. The playlist generation request may have associated playlist genre information.

In an embodiment, the at least one processor further receives, via the at least one input device, a map navigation command indicating that the user has selected at least a portion of the plurality of different locations on the map of the first graphical display, displayed via the at least one output device, transmits the map navigation command and receives a second graphical display, via the at least one communication interface, the second graphical display including at least the portion of the plurality of different locations on the map, and displays, via the at least one output device, the second graphical display. The second graphical display may depict at least one of a different level of focus and a different subset of locations than the first graphical display.

In an embodiment, the at least one processor further receives, via the at least one input device, a spin request from a user device, the spin request identifying at least one of a content category input and a geographical input, transmits the spin request and receives a second graphical display, via the at least one communication interface, the second graphical display including a first graphical indication electronically linking the second graphical display to a spin playlist specifying at least one composition of the plurality of different compositions based on at least one of the content category input and the geographical input, and displays, via the at least one output device, the second graphical display.

In an embodiment, the at least one processor further receives, via the at least one input device, a user icon selection command indicating that the user has selected a first user icon electronically linking the first graphical display to a first user profile of the plurality of user profiles, transmits the user icon selection command and receives a second graphical display, via the at least one communication interface, the second graphical display including a first graphical indication electronically linking the second graphical display to a first playlist electronically linked to the first user profile, and displays, via the at least one output device, the second graphical display.

In an embodiment, the at least one processor further receives, via the at least one input device, a playlist selection command indicating that the user has selected the first graphical indication electronically linking the second graphical display to the first playlist electronically linked to the first user profile, transmits the playlist selection command and receives a third graphical display, via the at least one communication interface, the third graphical display including a second graphical indication electronically linking the third graphical display to a first composition specified by the first playlist electronically linked to the first user profile, and displays, via the at least one output device, the third graphical display.

In an embodiment, the at least one processor further receives, via the at least one input device, a recommendation command electronically linked to a first user profile of the plurality of user profiles and indicating that the user has recommended a composition for a second playlist electronically linked to a second user profile, transmits the recommendation command such that an amount of points is assigned to the first user profile based on the recommendation command and receives a fourth graphical display, via the at least one communication interface, the fourth graphical display including a third graphical indication electronically linking the fourth graphical display to the recommended composition, and displays, via the at least one output device, the fourth graphical display.

In an embodiment, the at least one processor further receives, via the at least one input device, at least one of (A) a composition selection command indicating that the user has selected the second graphical indication electronically linking the third graphical display to the first composition specified by the first playlist electronically linked to the first user profile, (B) a composition deselection command indicating that the user has deselected the second graphical indication electronically linking the third graphical display to the first composition specified by the first playlist electronically linked to the first user profile, and (C) a composition copy command indicating that the user has specified the first composition in a second playlist electronically linked to a second user profile, such that an amount of points is assigned to the first user profile based on the at least one of (A), (B), and (C).

In an embodiment, the at least one processor further receives, via the at least one input device, a point amplifier command indicating that the user has electronically linked a point amplifier to a first user profile of the plurality of user profiles, the point amplifier command specifying a time period after which the point amplifier expires, and transmits the point amplifier command, via the at least one communication interface, such that, if an amount of points is to be assigned to the first user profile during the time period, an amplified amount of the amount of points is assigned to the first user profile. The time period may be at least one of random and predetermined.

In an embodiment, the at least one processor further receives, via the at least one input device, a composition push command electronically linked to a first user profile of the plurality of user profiles and indicating that the user has pushed a composition into a playlist electronically linked to a second user profile of the plurality of user profiles such that the playlist specifies the composition for a time period, transmits the composition push command, via the at least one communication interface, such that, if an amount of points is to be assigned to the second user profile based on the specified composition during the time period, a first portion of the amount of points is assigned to the first user profile and a second portion of the amount of points is assigned to the second user profile. The time period may be at least one of random and predetermined.

In an embodiment, the at least one processor further receives, via the at least one input device, a point siphon command electronically linked to a first user profile of the plurality of user profiles and indicating that the user has electronically linked a point siphon to a second user profile, the point siphon command specifying a time period after which the point siphon expires, and transmits the point siphon command, via the at least one communication interface, such that, if an amount of points is to be assigned to the second user profile during the time period, the amount of points is assigned only to the first user profile. The time period may be at least one of random and predetermined.

In an embodiment, the at least one processor further receives, via the at least one input device, a shield command electronically linked to a first user profile of the plurality of user profiles and indicating that the user has electronically linked a shield to the first user profile, the shield command specifying a time period after which the shield expires, and transmits the shield command, via the at least one communication interface, such that, if an amount of points is to be assigned to the first user profile during the time period, the full amount of points is assigned to the first user profile. The time period may be at least one of random and predetermined.

In one embodiment, a method is disclosed for running a multiplayer game based on content curation in a system including at least one communication interface for communicating information with at least one user device, at least one memory for storing processor-executable instructions, and at least one processor communicatively coupled to the at least one communication interface and the at least one memory, the information associated with a graphically simulated multiplayer gaming environment including a plurality of different locations and a plurality of different compositions. The method includes storing, in the at least one memory, a plurality of user profiles to be used in the graphically simulated multiplayer gaming environment, each user profile generated from a user profile generation request having associated user location information, storing, in the at least one memory, a plurality of playlists to be shared in the graphically simulated multiplayer gaming environment, each playlist generated from a playlist generation request having associated user profile information and associated playlist composition information such that each playlist is electronically linked to a user profile based on the associated user profile information and specifies at least one composition of a plurality of different compositions based on the associated playlist composition information, generating, via the at least one processor, a first graphical display including a map representing at least a subset of the plurality of different locations and at least one user icon, each user icon occupying a location of at least the subset of the plurality of different locations based on the associated user location information and electronically linking the first graphical display to a corresponding user profile of the plurality of user profiles and any corresponding playlists of the plurality of playlists based on the associated user profile information, and transmitting, via the at least one communication interface, information associated with the first graphical display to the at least one user device.

In an embodiment, the method includes assigning, via the at least one processor, an amount of points to a first user profile of the plurality of user profiles, the amount of points based on at least one of (A) a selection of at least one composition specified in at least one playlist electronically linked to the first user profile, (B) a deselection of the at least one composition specified in the at least one playlist electronically linked to the first user profile, (C) a copy operation to specify at least one composition from at least one playlist electronically linked to the first user profile in a different playlist electronically linked to a different user profile of the plurality of user profiles, and (D) a recommendation command to recommend at least one composition.

In an embodiment, the method includes ranking, via the at least one processor, at least a subset of the plurality of user profiles in at least a subset of the plurality of different locations based on an amount of points assigned to each user profile relative to the total amount of points assigned to at least the subset of the plurality of user profiles. A graphical property of a user icon may be determined based on an amount of points assigned to the corresponding user profile, the property being at least one of a color, a lighting effect, a size, and a shape of the user icon.

In an embodiment, the method includes ranking, via the at least one processor, at least a subset of the plurality of different compositions in at least a subset of the plurality of different locations based on at least one of (A) a number of composition selections by the at least one user device of each composition relative to the total amount of composition selections by the at least one user device of at least the subset of the plurality of different compositions, (B) a number of composition deselections by the at least one user device of each composition relative to the total amount of composition deselections by the at least one user device of at least the subset of the plurality of different compositions, (C) a number of composition copy operations by the at least one user device to specify each composition from a first playlist electronically linked to a first user profile of the plurality of user profiles in a different playlist electronically linked to a different user profile of the plurality of user profiles, and (D) a number of recommendation commands by the at least one user device to recommend each composition.

In an embodiment, the associated user location information is determined automatically from at least one of an Internet Protocol (IP) address, a Media Access Control (MAC) address, a radio-frequency identification (RFID), a Wi-Fi connection location, a satellite navigation position, a Cell ID, and credit card information.

In an embodiment, the method includes receiving, via the at least one communication interface, a new user profile generation request from a user device, the new user profile generation request identifying a new user profile to be used in the graphically simulated multiplayer gaming environment, the new user profile generation request having the associated user location information, generating, via the at least one processor, and storing, in the at least one memory, the new user profile, generating, via the at least one processor, a second graphical display including a new user icon occupying a location of the plurality of different locations based on the associated user location information, the new user icon electronically linking the second graphical display to the new user profile, and transmitting, via the at least one communication interface, information associated with the second graphical display to the at least one user device. In an embodiment, the method includes receiving, via the at least one communication interface, a new playlist generation request from a user device, the new playlist generation request identifying a new playlist to be shared in the graphically simulated multiplayer gaming environment, the new playlist generation request having the associated user profile information and the associated playlist composition information, generating, via the at least one processor, and storing, in the at least one memory, the new playlist specifying at least one composition of the plurality of different compositions based on the associated playlist composition information, generating, via the at least one processor, a second graphical display including an indication of the new playlist electronically linking the second graphical display to the new playlist, and transmitting, via the at least one communication interface, information associated with the second graphical display to the at least one user. The playlist generation request may have associated playlist genre information. Each playlist may specify from about five compositions to about fifty compositions.

In an embodiment, the method includes receiving, via the at least one communication interface, a map navigation command indicating that a user device has selected at least a portion of the plurality of different locations on the map. generating, via the at least one processor, a second graphical display including at least the portion of the plurality of different locations on the map, and transmitting, via the at least one communication interface, information associated with the second graphical display to the user device. The second graphical display may depict at least one of a different level of focus and a different subset of locations than the first graphical display.

In an embodiment, the method includes receiving, via the at least one communication interface, a spin request from a user device, the spin request identifying at least one of a content category input and a geographical input, generating, via the at least one processor, and storing, in the at least one memory, a spin playlist specifying at least one composition of the plurality of different compositions based on at least one of the content category input and the geographical input, generating, via the at least one processor, a second graphical display including an indication of the spin playlist electronically linking the second graphical display to the spin playlist, and transmitting, via the at least one communication interface, information associated with the second graphical display to the at least one user.

In an embodiment, the method includes receiving, via the at least one communication interface, a user icon selection command indicating that a user device has selected a first user icon electronically linking the first graphical display to a first user profile of the plurality of user profiles, generating, via the at least one processor, a second graphical display including a first graphical indication electronically linking the second graphical display to a first playlist electronically linked to the first user profile, and transmitting, via the at least one communication interface, information associated with the second graphical display to the user device.

In an embodiment, the method includes receiving, via the at least one communication interface, a playlist selection command indicating that the user device has selected the first graphical indication electronically linking the second graphical display to the first playlist electronically linked to the first user profile of the plurality of user profiles, generating, via the at least one processor, a third graphical display including a second graphical indication electronically linking the third graphical display to a first composition specified by the first playlist electronically linked to the first user profile, and transmitting, via the at least one communication interface, information associated with the third graphical display to the user device.

In an embodiment, the method includes receiving, via the at least one communication interface, a recommendation command indicating that the user device associated with a second user profile has recommended a composition for the first playlist electronically linked to the first user profile of the plurality of user profiles, assigning, via the at least one processor, an amount of points to the second user profile based on the recommendation command, generating, via the at least one processor, a fourth graphical display including a third graphical indication electronically linking the fourth graphical display to the recommended composition, and transmitting, via the at least one communication interface, information associated with the fourth graphical display to the user device.

In an embodiment, the method includes receiving, via the at least one communication interface, at least one of (A) a composition selection command indicating that the user device has selected the second graphical indication electronically linking the third graphical display to the first composition specified by the first playlist electronically linked to the first user profile, (B) a composition deselection command indicating that the user device has deselected the second graphical indication electronically linking the third graphical display to the first composition specified by the first playlist electronically linked to the first user profile, and (C) a composition copy command indicating that the user device has specified the first composition in a second playlist electronically linked to a second user profile. The method also includes assigning, via the at least one processor, an amount of points to the first user profile based on the at least one of (A), (B), and (C).

In an embodiment, the method includes receiving, via the at least one communication interface, a point amplifier command indicating that a user device has electronically linked a point amplifier to a user profile, the point amplifier specifying a time period after which the electronic link expires, and if an amount of points is to be assigned to the user profile during the time period, assigning, via the at least one processor, an amplified amount of the amount of points to the user profile. The time period may be at least one of random and predetermined.

In an embodiment, the method includes receiving, via the at least one communication interface, a composition push command indicating that a user device associated with a first user profile of the plurality of user profiles has pushed a composition into a playlist electronically linked to a second user profile such that the playlist specifies the composition for a time period. If an amount of points is to be assigned to the second user profile based on the composition during the time period, the method includes assigning, via the at least one processor, a first portion of the amount of points to the first user profile and a second portion of the amount of points to the second user profile. The time period may be at least one of random and predetermined.

In an embodiment, the method includes receiving, via the at least one communication interface, a point siphon command indicating that a user device associated with a first user profile of the plurality of user profiles has electronically linked a point siphon to a second user profile, the point siphon specifying a time period after which the electronic link expires, and if an amount of points is to be assigned to the second user profile during the time period, assigning, via the at least one processor, the full amount of points to the first user profile. The time period may be at least one of random and predetermined.

In an embodiment, the method includes receiving, via the at least one communication interface, a shield command indicating that a user device associated with a first user profile of the plurality of user profiles has electronically linked a shield to the first user profile, the shield specifying a time period after which the electronic link expires, and if an amount of points is to be assigned to the first user profile during the time period, assigning, via the at least one processor, the full amount of points to the first user profile regardless of at least one of a point siphon and a composition push. The time period may be at least one of random and predetermined.

In some embodiments, the plurality of different compositions include at least one of recorded speech, an image, a music recording, and a video recording.

In some embodiments, the map is represented by at least one grid plane and each location of the plurality of different locations is a grid tile in the at least one grid plane. In some embodiments, the map includes at least one of a virtual world boundary representing a real world boundary, and a virtual world landmark representing a real world landmark.

In some embodiments, each user icon is represented by a virtual world object. The virtual world object may be a house.

In some embodiments, a first user profile of the plurality of user profiles at least one of pays and plays to customize a first user icon electronically linked to the first user profile for a time period such that at least one of a color, a lighting effect, a size, and a shape are modified during the time period.

In some embodiments, a first user profile of the plurality of user profiles at least one of pays and plays to inhabit a virtual world landmark representing a real world landmark for a time period such that the virtual world landmark electronically links to the first user profile and any corresponding playlists of the plurality of playlists during the time period.

In some embodiments, a first user profile of the plurality of user profiles at least one of pays and plays to activate a mass composition push command for a time period such that a user device associated with the first user profile pushes a composition into at least one playlist of the plurality of playlists, the first user profile electronically linked to a first user icon, at least one of the location and rank of the first user icon determining a radius including at least one other user icon, the at least one other user icon electronically linked to at least one other user profile, the at least one other user profile corresponding to the at least one playlist, and at least a portion of any amount of points to be assigned to the at least one other user profile based on the composition during the time period is assigned to the first user profile instead.

In some embodiments, a first user profile of the plurality of user profiles at least one of pays and plays to activate a mass point siphon command for a time period such that a user device associated with the first user profile electronically links a point siphon to at least one other user profile, the first user profile electronically linked to a first user icon, at least one of the location and rank of the first user icon determining a radius including at least one other user icon, the at least one other user icon electronically linked to the at least one other user profile, and any amount of points to be assigned to the at least one other user profile during the time period is assigned to the first user profile instead.

In some embodiments, a first user profile of the plurality of user profiles at least one of pays and plays to activate a user icon multiplying command for a time period such that a user device associated with the first user profile electronically links the first user profile to a plurality of copies of a corresponding first user icon, each copy of the first user icon occupying a different location of the plurality of different locations during the time period.

In some embodiments, a first user profile of the plurality of user profiles at least one of pays and plays to activate a rate increasing command for a time period so as to increase a rate at which the first user profile earns points during the time period, increase an amount of points assigned to the first user profile during the time period, increase a rate at which a corresponding first user icon electronically linked to the first user profile is modified during the time period, discount in-app purchases by the first user profile during the time period, reduce a conversion rate of points to in-app currency for the first user profile during the time period, increase a command time period for another command from the first user profile during the time period, and increase a number of recommendation commands available to the first user profile during the time period.

In some embodiments, the plurality of user profiles to be used in the graphically simulated multiplayer gaming environment includes at least one advertiser profile, and the at least one advertiser profile pays for a watermark to advertise over at least a portion of the map for a time period, the portion of the map including at least one of a grid tile in at least one grid plane representing each location of the plurality of different locations, an area enclosed by at least one virtual world boundary representing a real world boundary, and a virtual world landmark representing a real world landmark.

In some embodiments, the plurality of user profiles to be used in the graphically simulated multiplayer gaming environment includes at least one advertiser profile, the at least one advertiser profile pays for a virtual world object to advertise on the map for a time period, and the virtual world object includes at least one of a building and a vehicle.

In some embodiments, the virtual world object includes a boat located in virtual body of water representing a real world body of water.

In some embodiments, the plurality of user profiles to be used in the graphically simulated multiplayer gaming environment includes an advertiser profile, and the at least one user icon includes an advertiser icon, the advertiser icon electronically linking the advertiser profile and any corresponding playlists of the plurality of playlists based on associated advertiser profile information such that the advertiser profile at least one of distributes content, curates content, sponsors content, and solicits content curation in the graphically simulated multiplayer gaming environment.

In some embodiments, a subset of the plurality of user profiles collaborate as a group profile, the group profile generated from a group profile generation request having user location information associated with the subset of the plurality of user profiles, and a group icon occupies at least one location of the plurality of different locations based on the associated user location information, the group icon electronically linking the corresponding group profile and any corresponding playlists of the plurality of playlists electronically linked to the group profile based on user profile information associated with the subset of the plurality of user profiles.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

Other systems, processes, and features will become apparent to those skilled in the art upon examination of the following drawings and detailed description. It is intended that all such additional systems, processes, and features be included within this description, be within the scope of the present invention, and be protected by the accompanying claims.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIG. 6 is a graphic representation of at least part of a gaming environment including a drop-down menu of players for review and/or selection in accordance with some embodiments.

FIG. 7 is a graphic representation of at least part of a gaming environment including search features in accordance with some embodiments.

FIG. 19 is a graphic representation of a playlist in accordance with some embodiments.

FIG. 20 is a graphic representation of a user station with more than one playlist in a gaming environment in accordance with some embodiments.

FIG. 23 is a graphic representation of user item performance associated with a gaming environment in accordance with some embodiments.

FIG. 25 is a graphic representation of a store for in-app currency associated with a gaming environment in accordance with some embodiments.

FIG. 26 is a graphic representation of a playlist and recommendations for the playlist in a gaming environment in accordance with some embodiments.

DETAILED DESCRIPTION

The present disclosure relates generally to systems, apparatus, and methods for selecting, distributing, and/or consuming content over a network. More specifically, the present disclosure relates to systems, apparatus, and methods for a user to compete with, recommend to, market to, and/or otherwise interact with other users over a network using information and experiences directed toward an end-user or audience. The systems, apparatus, and methods described herein are content agnostic. That is, content may include information and experiences intended for an end-user, including but not limited to recorded speech, written productions, images, recorded music, and video recordings. Similarly, an author of content may be one person, more than one person, or a non-person entity. An author may be a content creator, a copyright holder, an assignee (e.g., a publisher), and/or a licensee (e.g., a distributor). An author may be associated with some aspects of an item of content but not others (e.g., lyrics vs. music, audio performance, visual performance etc.).

Figure 1:
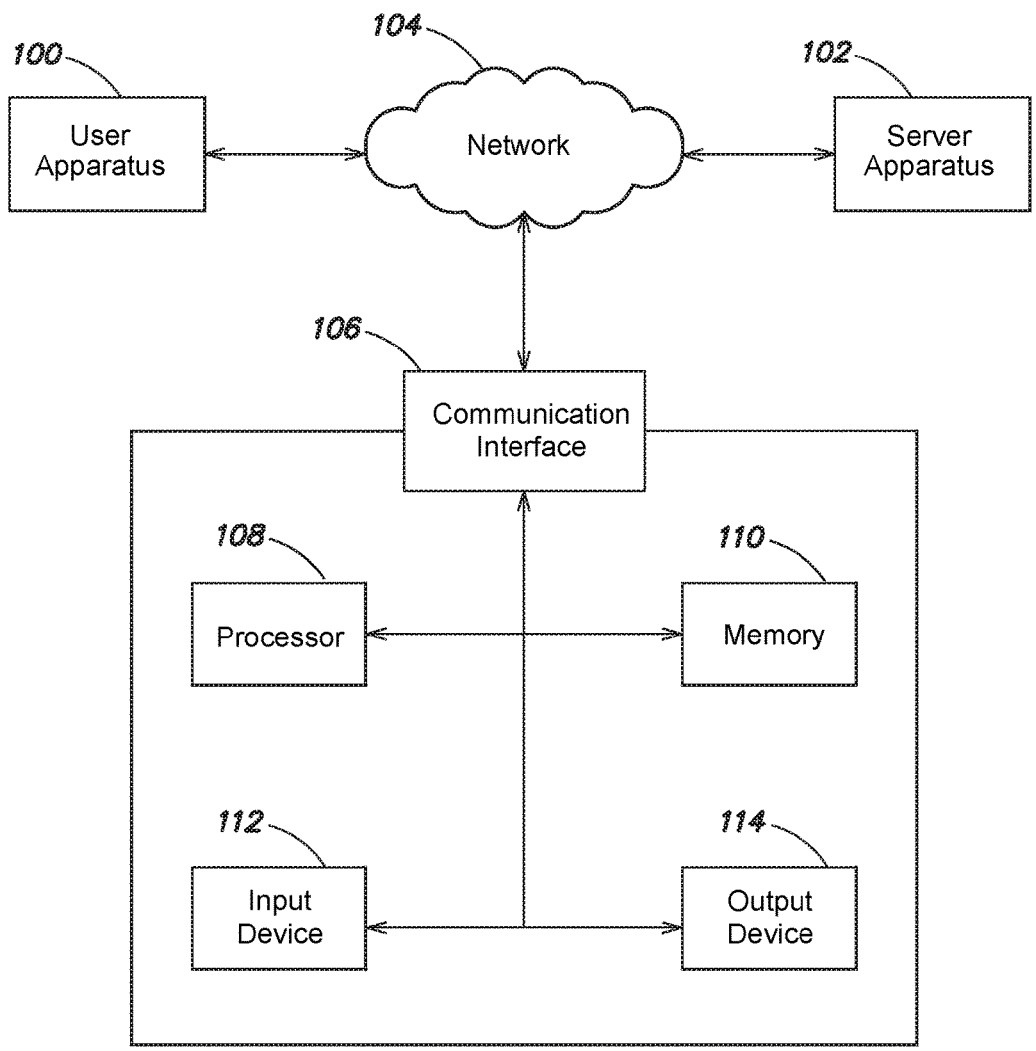
FIG. 1 is a block diagram illustrating systems and apparatus in accordance with some embodiments.

FIG. 1 is a block diagram illustrating systems and apparatus in accordance with some embodiments. Apparatus are described for selecting, distributing, and/or consuming content over a network. For example, one or more apparatus may be used for hosting a multiplayer game based on content curation and/or playing a multiplayer game based on content curation. As shown in FIG. 1, user apparatus 100 may be connected to server apparatus 102 via at least one network 104 (e.g., the Internet).

User apparatus 100 and/or server apparatus 102 may include at least one communication interface 106 for communicating information over at least one network 104 to at least one other apparatus. User apparatus 100 and/or server apparatus 102 also may include at least one processor 108, at least one memory 110 for storing processor-executable instructions, at least one input device 112 for a user or administrator to input data, and at least one output device 114 for a user or administrator to receive data. Processor 108 may be communicatively coupled to at least communication interface 106, at least one memory 110, at least one input device 112, and/or at least one output device 114. User apparatus 100 and/or server apparatus 102 also may include one or more settlement modules for interacting with one or more settlement services (e.g., a financial service provider, a virtual or conventional financial payment system, and/or a direct transfer of funds from a user's bank account), one or more gaming modules for implementing game functions, and/or one or more web modules for coordinating a user interface with the apparatus. Further examples of systems, apparatus, and networks for selecting, distributing, and/or consuming content are provided herein.

According to some embodiments, a multiplayer game based on content curation is accessible using an apparatus, such as a computer, gaming console, and/or mobile device. The multiplayer game may require network access to run or allow at least some functionality without network access. The multiplayer game may include a multiplayer gaming environment. The multiplayer gaming environment may be accessed via an interactive portal, such as a computer program, a video game, a mobile app, or a website. One or more users or administrators may interact with the multiplayer gaming environment using one or more input devices and/or output devices. The multiplayer gaming environment may be graphically and/or audibly simulated using an output device such as a display and/or speaker. For example, a display may provide a graphic representation of the gaming environment to a user. A display also may provide visual content, such as a video composition, to a user. In another example, a speaker may provide an audio representation of the gaming environment as well as audio content, such as a musical composition, to a user.

User apparatus 100 may initially contact server apparatus 102 remotely over network 104 via communication interface 106 of user apparatus 100. This contact may include accessing an interactive portal. User apparatus 100 may download an application and/or instructions from server apparatus 102. User apparatus 100 may submit a new user profile generation request via a network-based or application-based interactive portal. The new user profile generation request may identify a new user profile to be used in the multiplayer gaming environment. The new user profile generation request may include information about the user, particularly location information associated with the user and/or user apparatus 100. The new user profile generation request may also include a log-in name and/or password for accessing the multiplayer gaming environment in the future. In some embodiments, the new user profile generation request may include payment and/or payment information (e.g., real and/or alternative currency like bitcoin) for future in-app purchases.

Based on the new user profile generation request, server apparatus 102 may generate and store a new user profile with or linked to the information about the user in one or more memory devices. The one or more memory devices may be used to store user profile information regarding each of the users that register as described above. A user may be prompted to enter information and/or prompted to grant permission via user apparatus 100 for the application to access information about or related to other applications operable on user apparatus 100. The information may be optional and/or mandatory to register or maintain a user profile. The information may include, but is not limited to, the user's name, location, age, gender, occupation, education, content preferences, apparatus settings, and activity within the network.

In particular, the one or more memory devices associated may be used to record a different location associated with each of the registered users. In addition, the one or more memory devices may be used to store or link to a plurality of different compositions associated with each of the registered users. The one or more memory devices further may log game history information for and/or based on one or more registered users, one or more locations, and/or one or more compositions.

In the future, user apparatus 100 and/or server apparatus 102 may receive log-in information and either accept or reject a user based on the received log-in information. That is, the apparatus compares the received log-in information to user profiles for registered users. The user is accepted if the received log-in information matches that of one of the registered users. If a user is accepted, the user may review and/or edit his or her user profile. The interactive portal allows a user to interact with his or her account information. For example, a user may view his or her account information on a display of user apparatus 100. In addition, a user may interact with the multiplayer gaming environment, including one or more graphic and/or audio simulations of the multiplayer gaming environment.

In some embodiments, a multiplayer gaming environment is accessible to users with or without registration (e.g., submitting a new user profile request). For example, without registration, a user may be permitted to interact with at least some of the features of the gaming environment, such as content (e.g., downloading, streaming, rating, and/or sharing content). Without registration, a user may be permitted to earn points but may be prompted to sign up in order to redeem those points for in-game or real world rewards, awards, and/or incentives.

In some embodiments, an administrator monitors operation of server apparatus 102. Server apparatus 102 may notify the administrator of attempts at unsanctioned access, cheating, and various other prohibited actions on the part of users. Improper actions may be blocked using dynamic filtering rules. The administrator may grant, suspend, and/or restrict the access of users to server apparatus 102.

In some embodiments, the multiplayer gaming environment includes a plurality of different locations stored in at least one memory of at least one apparatus. The locations may be spatial locations corresponding to real or imaginary geography, including physical geography and human geography. For example, the locations may be representative of political, cultural, social, economic, arbitrary, and/or fictional boundaries. A graphic representation of the gaming environment may include one or more buttons, menus, toolbars, containers (e.g., windows, panels, or tabs), GUI overlays, and/or other widgets.

In some embodiments, a graphic representation of the gaming environment includes one or more spatial representations. A spatial representation may represent but is not limited to a user, a location, and/or content. For example, a graphic representation of the gaming environment may include one or more maps. A map may be general, thematic, or orienteering. A map may be realistic or topological. A map may be represented and/or manipulated according to perspective, area, shape, direction, bearing, distance, and/or scale. An area on a map may be divided into smaller areas according to, for example, a grid or political boundaries. In some embodiments, a virtual world boundary represents a real world boundary. A virtual world landmark also may represent a real world landmark, either a natural (e.g., a tree or Mount Everest) or artificial (e.g., a lighthouse or the Empire State Building) feature that stands out from its near environment. In some embodiments, a virtual world boundary may represent a fictional boundary, and a virtual world landmark may represent a fictional landmark (e.g., "the Wall" in George R. R. Martin's Game of Thrones, available from Bantam Books (New York, N.Y.)).

In some embodiments, a user profile includes or is linked to one or more locations. A location may be assigned to a user profile somewhat randomly or determined, at least in part, from input solicited from the user associated with the profile. A user may be given the option of supplying a generic location (e.g., a zip code). Alternatively, a location may be determined automatically or semi-automatically based on at least one of an Internet Protocol (IP) address, a Media Access Control (MAC) address, a radio-frequency identification (RFID), a Wi-Fi connection location, a satellite navigation position, a Cell ID, and payment (e.g., credit card) information associated with a user. A user may grant permission allowing a user apparatus to provide a geographic location of the user. An IP address, MAC address, RFID, Wi-Fi connection location, satellite navigation position, and/or Cell ID may be associated with an apparatus used to initiate a user's user profile (i.e., submit a new user profile request) or used to maintain or modify the profile.

A location may be static or dynamic (i.e., based on real-time location information). For example, a mobile device (e.g., a cell phone, a smartphone, a tablet, or a laptop computer) may transmit GPS coordinates corresponding to a user's current location (which may be determined by, for example, an on-board GPS location sensor) to a server apparatus. A location may correspond to a real or imaginary geography and be spatially represented by, for example, an area on a map bounded by grid lines, political boundaries, etc. A symbol, such as a graphical icon, text, or audio, may be used to identify an exact or relative location associated with at least one user or at least one composition, and/or otherwise facilitate selecting, distributing, and/or consuming content.

Figure 2:
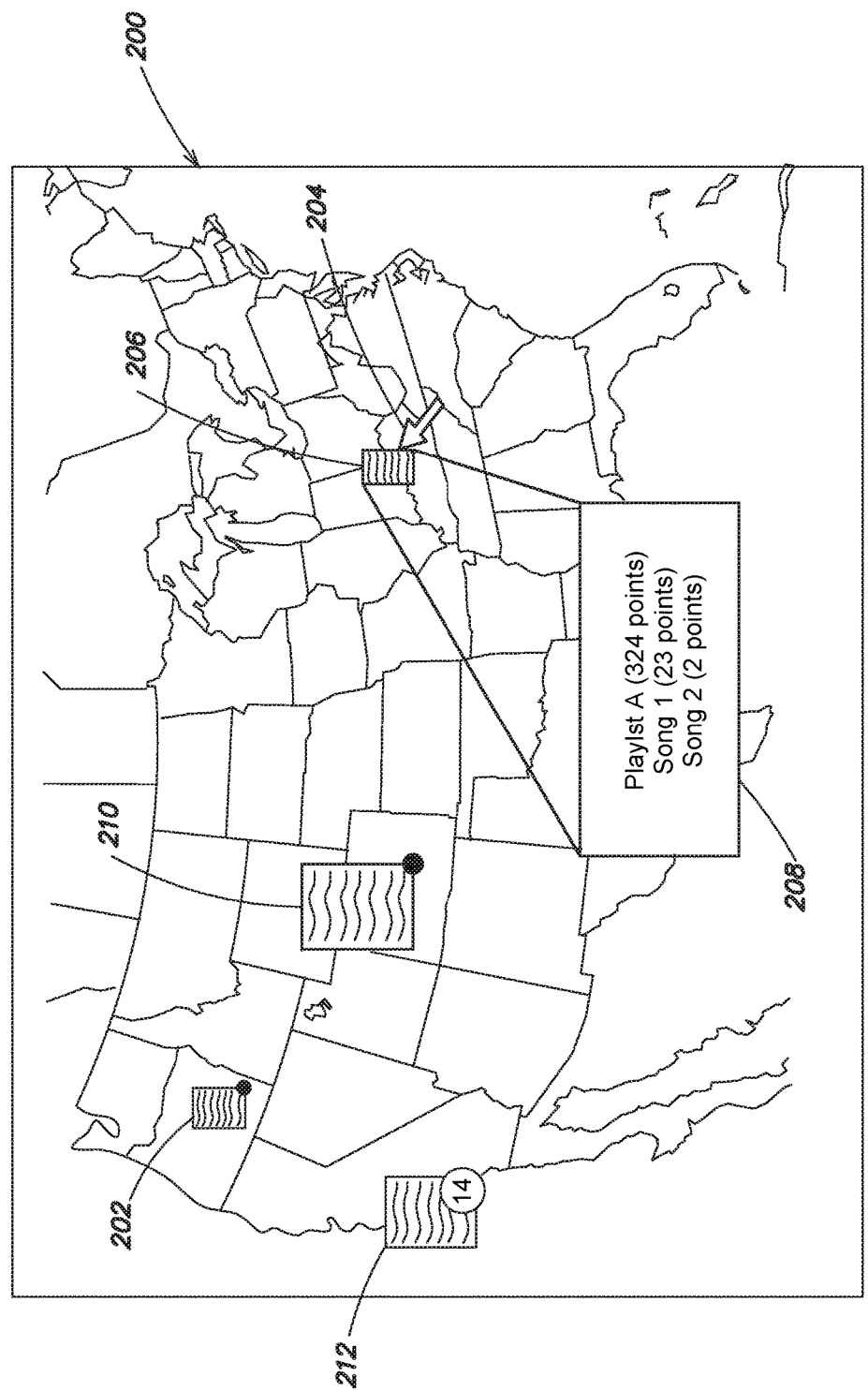
FIG. 2 is a graphic representation of at least part of a gaming environment including at least one content overlay on a map of the United States in accordance with some embodiments.

FIG. 2 is a graphic representation of at least part of a gaming environment including spatial representations of content overlaid on a map in accordance with some embodiments. In FIG. 2, the gaming environment corresponds to the geography of and includes a spatial representation 200 (i.e., a map) of at least the United States. Map 200 is divided into smaller areas, including states and cities.

In FIG. 2, the presence of content is indicated by symbols overlaid on map 200. The locations of the symbols relative to map 200 corresponds to locations associated with one or more users. For example, symbol 202 corresponds to a location in southeastern Oregon associated with a user. In FIG. 2, the symbols further indicate content shared and/or curated by the user, for example, in the form of a playlist. Users may select an icon to open a widget (e.g., a container overlay) allowing the user to view content or information about the content. For example, a user input device may be used to operate cursor 204 to select symbol 206, thereby opening window overlay 208, which displays Playlist A consisting of Song 1 and Song 2.

In some embodiments, the size of an icon is variable and/or is configured to grow proportionally to, for example, a ranking of a user and/or content shared and/or curated by the user. For example, the difference in ranking between a first user and a second user, based on one or more of points, popularity, and other metrics (as discussed below), may be represented graphically. In FIG. 2, symbol 210 is larger than symbol 202, indicating that the user associated with symbol 210 and/or at least some of the content shared and/or curated by the user associated with symbol 210 is ranked higher in the gaming environment than the user associated with symbol 202 and/or at least some of the content shared and/or curated by the user associated with symbol 202.

In some embodiments, the level of magnification necessary to view an icon may change as a ranking of a corresponding user and/or corresponding content shared and/or curated by the user changes. For example, only icons representing a particularly high rank may be viewed and/or selected at lower levels of magnification, whereas most icons may be viewed and/or selected at higher levels of magnification. For example, a first magnification level may be characterized as a long distance view of the map, the longest at which icons are still visible, thereby incentivizing users to increase the size of their icons for access at the first magnification level. A second magnification level also may be characterized as a distance view of the map at which icons are still visible, thereby incentivizing users to increase the size of their icons for access at the first magnification level. A third magnification level further may be characterized as a closer view of the map at which all icons are visible, thereby incentivizing users to increase the size of their icons for access at the second or first magnification levels. The number of magnification levels may vary. Alternatively, a continuous curve of magnification may be available.

Depending on the area and level of magnification of a graphic representation such as a map, one or more symbols may be within view, or no symbols may be within view. When too many symbols are present and/or when symbols overlap, the symbols may be consolidated. In FIG. 2, instead of showing fourteen symbols in California, single symbol 212 includes a numerical indicator of the number of users and/or the amount of content shared and/or curated by the users associated with the location.

Figure 3:
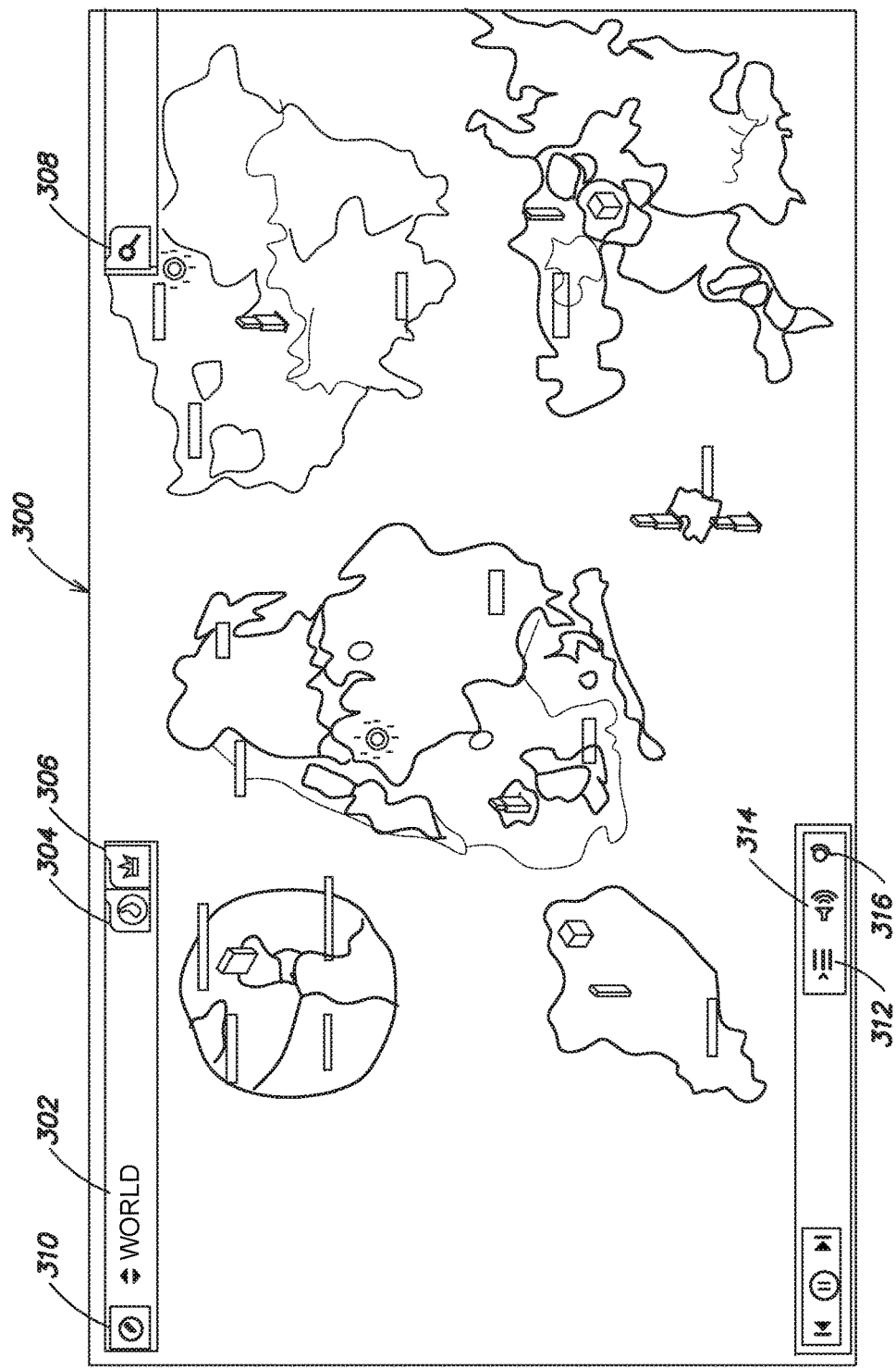
FIG. 3 is a graphic representation of at least part of a gaming environment including at least one content overlay on a topological and/or fictional world map in accordance with some embodiments.

FIG. 3 is a graphic representation of at least part of a gaming environment including at least one content overlay on a topological and/or fictional world map in accordance with some embodiments. In FIG. 3, the gaming environment includes a spatial representation 300 (i.e., a map) of a plurality of landmasses corresponding to, for example, the geography of the boroughs of New York City as well as other neighborhoods and cities, both real and fictional.

Figure 4:
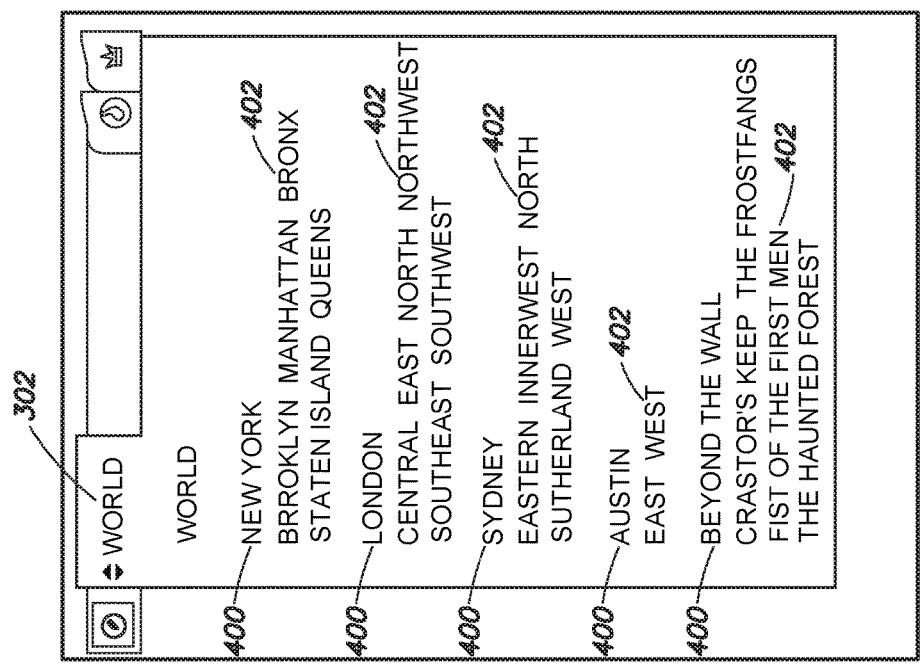
FIG. 4 is a graphic representation of at least part of a gaming environment including a drop-down menu of geographic locations for review and/or selection in accordance with some embodiments.

FIG. 3 is an example of a basic view, in some embodiments, the first thing a user may see upon logging into the gaming environment. From there, a user may select an icon to open a widget (e.g., a container overlay) allowing the user to select a specific area and/or location for viewing. For example, a user input device may be used to select drop-down menu 302, thereby opening a container overlay displaying choices of location areas in the gaming environment. FIG. 4 is a graphic representation of at least part of a gaming environment, in accordance with some embodiments, including drop-down menu 302, which presents cities 400 (e.g., New York, London, Sydney, and Austin) as well as particular subsets or neighborhoods of those cities 402, for selection. A user may use a user input device to select a specific area and/or location in a number of other ways including, but not limited to, selecting the specific area and/or location with a pointing device, directional controls, and/or magnification controls.

Figure 5:
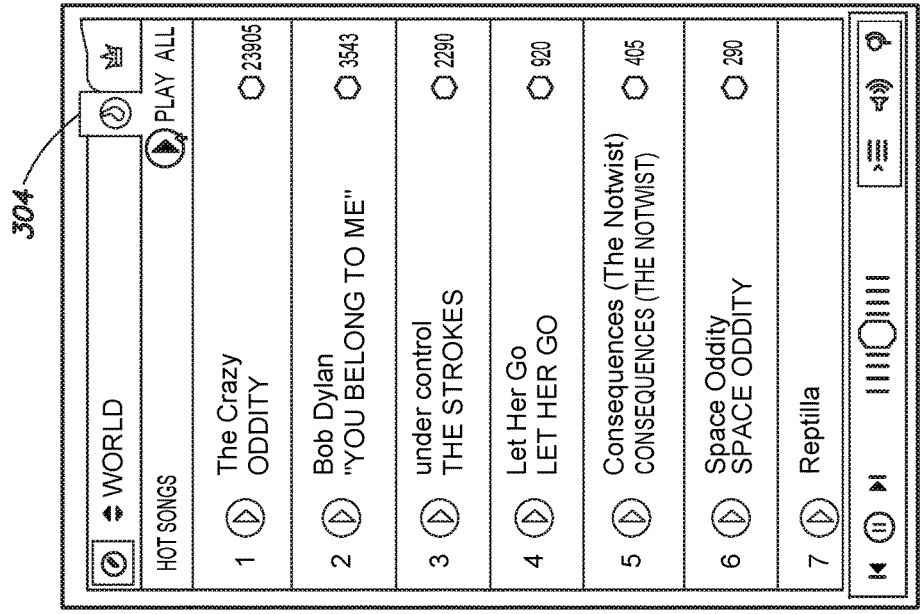
FIG. 5 is a graphic representation of at least part of a gaming environment including a drop-down menu of content for review and/or selection in accordance with some embodiments.

In some embodiments, a user may select an icon to open a widget (e.g., a container overlay) allowing the user to view one or more content rankings. For example, a user input device may be used to select drop-down menu 304, thereby opening a container overlay displaying a chart of the most popular content in the gaming environment for viewing, consumption, etc. FIG. 5 is a graphic representation of at least part of a gaming environment including drop-down menu 304, which presents the most popular compositions (e.g., songs) in the gaming environment for viewing and/or selecting in accordance with some embodiments.

In some embodiments, a widget (e.g., tab) for presenting the most popular compositions is always displayed and/or available. The most popular compositions may be presented as a real-time list and include compositions that have accumulated the most points within a particular geographic location and/or area. A user may select a "Play All" button or select each composition individually. A registered user may further elect to queue a composition from the most popular compositions for a future experience and/or add a composition from the most popular compositions to his or her playlist. In some embodiments, a composition earns points for each time that the composition is selected, added, and/or queued. The composition may earn points only for times when the composition is selected, added, and/or queued by, for example, a registered user.

In some embodiments, a user may select an icon to open a widget (e.g., a container overlay) allowing the user to view one or more user rankings. For example, a user input device may be used to select drop-down menu 306, thereby opening a container overlay displaying a chart of the most popular users or users with the most points in the gaming environment. FIG. 6 is a graphic representation of at least part of a gaming environment including drop-down menu 306, which presents the highest-scoring players (i.e., the leaderboard) in the gaming environment, in accordance with some embodiments.

In some embodiments, a widget (e.g., tab) for presenting the leaderboard is always displayed and/or available. The leaderboard may be presented as a real-time list and include compositions that have accumulated the most points within a particular geographic location and/or area. A registered user may elect to follow one of the highest-scoring players from the leaderboard. In some embodiments, a player earns points for each time that the player is followed. The player may earn points only for times when the player is followed by, for example, a registered user.

In some embodiments, a user may perform a search of the gaming environment for a particular user (by, e.g., username), user location or station (by, e.g., corresponding geographic location and/or area), and/or playlist or content (by, e.g., a content type, genre, and/or name). For example, a user input device may be used to initiate a search function in a gaming environment by, for example, selecting an icon to open a container overlay displaying a search box. Alternatively, a search box always may be present in a gaming environment. A user input device may be used to enter at least one search term in the search box. Once the gaming environment or a select portion thereof is searched for a match, a container overlay may open to display results of the search. Once search results are displayed, a user may select one or more results to navigate directly to a user location, a user station, a playlist, and/or content. The organization and/or order of the displayed search results may be according to one or more rules including, but not limited to, a level of relevance to one or more search terms and/or ranking metrics.

FIG. 7 is a graphic representation of at least part of a gaming environment including search box 308 and search results based on a search of users or players in the gaming environment in accordance with some embodiments. Search box 308, represented by, for example, an icon of a magnifying glass, is always available in the gaming environment illustrated in FIG. 7.

In some embodiments, a user is prompted to join the gaming environment or sign in as a registered user via a widget (e.g., a container overlay). In other embodiments, a user may select an icon to open a widget (e.g., a container overlay) allowing the user to register or sign in as a registered user. For example, a user input device may be used to select icon 310, thereby opening a container overlay for receiving at least one of a new user profile generation request and log-in information.

In some embodiments, a user may select one or more icons and/or open one or more widgets (e.g., a container overlay) allowing the user to interact with the gaming environment. For example, a user input device may be used to select icon 312, thereby opening a container overlay displaying a queue of compositions associated with a particular user in the gaming environment. In another example, a user input device may be used to select icon 314, thereby opening a container overlay displaying a volume control for audio associated with the gaming environment.

In some embodiments, a gaming environment provides for continuous play of at least some content. A continuous playlist of content may be generated based on one or more of these inputs. The order of the content may be based on at least one of a random number generator, a date of "discovery" (e.g., introduced to the gaming environment by, for example, a registered user), a location of discovery, a number of times the content has been selected and/or completed since discovery or within a particular timeframe, a number of points the content has accumulated since discovery or within a particular timeframe, and a number of recommendations or other interactive features activated in association with the content. A user may specify and/or filter continuous play by, for example, using a user input device to elect and/or select at least one content type, genre, composition reference, author reference, hashtag, and/or other category.

Instead or in addition, a user may specify and/or filter continuous play by, for example, geographical area and/or location. As indicated in FIG. 3, a user input device further may be used to select icon 316, thereby initiating a function designed to select content from around the world map or at least a specific area and/or location of the world map. Thus, the user may receive content, or content may be linked to the queue of content associated with the user based on at least the geographic location associated with the content, thereby generating a radio-like continuous stream of targeted content has a corresponding graphical representation. The graphical representation may change with the changing sources of content (e.g., a first composition associated with a first user station may be followed by a second composition associated with a second user station). For example, a spatial representation of a map may be shifted to center the source in view, magnified to better view the source, and/or highlighted to direct attention to the source.

In some embodiments, a user executes one or more of the operations described herein in a mode that geographically limits the users and content to a specific area and/or location of the gaming environment. For example, a user input device may be used to select New York City, thereby displaying a graphic representation of a select part of the gaming environment.

Figure 8:
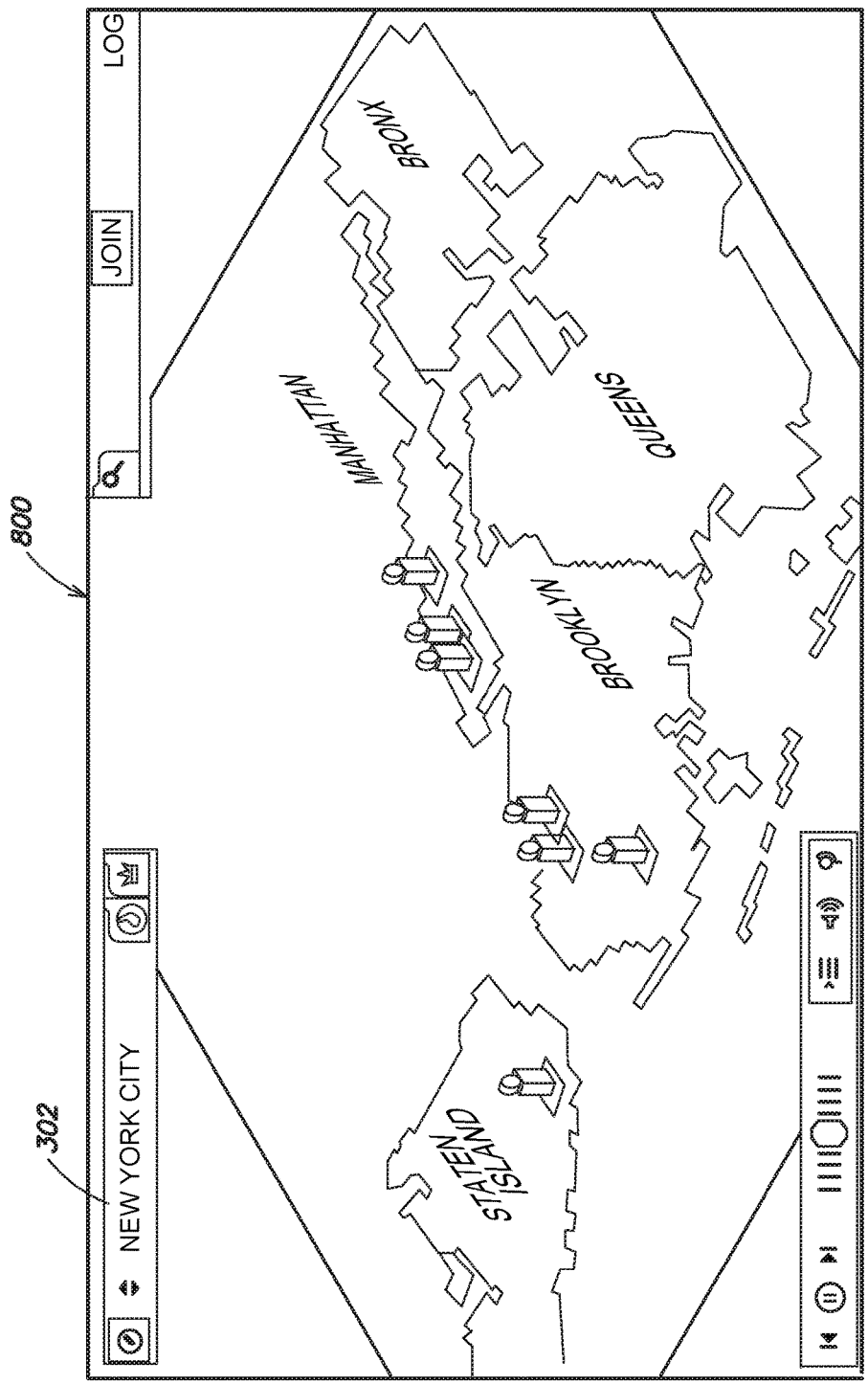
FIG. 8 is a graphic representation of at least part of a gaming environment including a map corresponding to the geography of a real city in accordance with some embodiments.

FIG. 8 is a graphic representation of New York City in a gaming environment including a spatial representation 800 of a plurality of landmasses corresponding to the geography of New York City in accordance with some embodiments. A user may select an icon to open a widget (e.g., a container overlay) allowing the user to view one or more content rankings and/or one or more user rankings; perform a search of the gaming environment for a particular user, user location or station, playlist, and/or content; and/or otherwise interact with the select part of the gaming environment (e.g., New York City). For example, a user input device may be used to initiate a function designed to automatically and/or randomly select content from around New York City such that a user automatically and/or randomly receives content or content is linked to the queue of content associated with the user based on at least an association between the content and New York City.

The graphic representation in FIG. 8 may be selected as the first view a user sees upon logging into the gaming environment. From there, a user may use a user input device to select a more specific area and/or location in a number of other ways including, but not limited to, selecting the specific area and/or location with a drop-down menu, a pointing device, directional controls, and/or magnification controls. For example, a user input device may be used to select Staten Island, a borough of New York City, thereby displaying a graphic representation of a select part of the gaming environment. Alternatively, a user may use a user input device to shift and/or expand the area and/or location for viewing in a number of ways including, but not limited to, shifting and/or selecting the expanded area and/or location with a drop-down menu, a pointing device, directional controls, and/or magnification controls.

Figure 9:
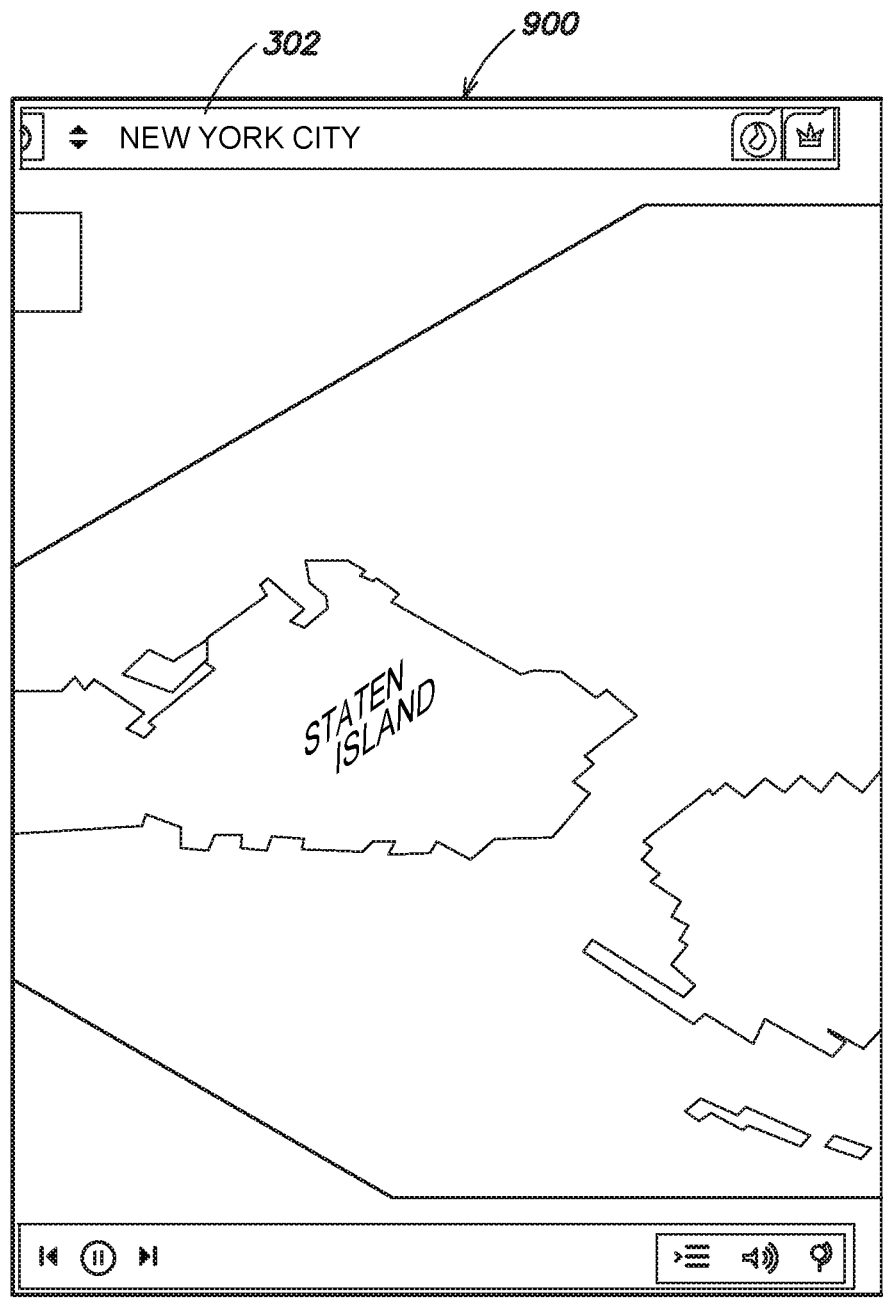
FIG. 9 is a graphic representation of at least part of a gaming environment including a magnified portion of the map in FIG. 8 in accordance with some embodiments.

FIG. 9 is a graphic representation of Staten Island in a gaming environment including a spatial representation 900 of a landmass corresponding to the geography of the borough in accordance with some embodiments. Again, a user may select an icon to open a widget (e.g., a container overlay) allowing the user to view one or more content rankings and/or one or more user rankings; perform a search of the gaming environment for a particular user, user location or station, playlist, and/or content; and/or otherwise interact with the select part of the gaming environment (e.g., Staten Island). For example, a user input device may be used to initiate a function designed to automatically and/or randomly select content from around Staten Island such that a user automatically and/or randomly receives content or content is linked to the queue of content associated with the user based on at least an association between the content and the borough.

Figure 10:
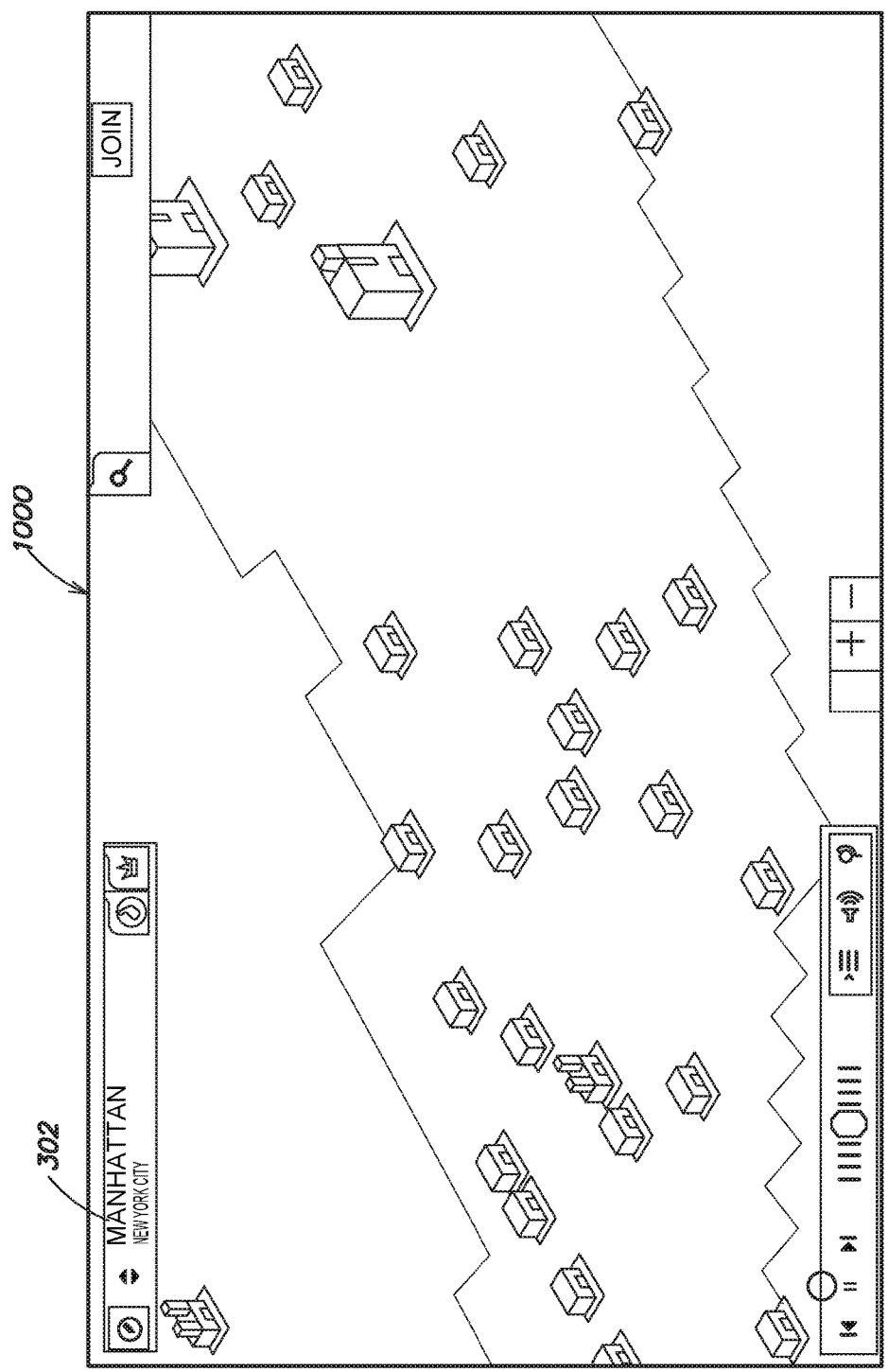
FIG. 10 is a graphic representation of at least part of a gaming environment including a magnified portion of a map corresponding to the geography of a first area and/or location in accordance with some embodiments.

FIG. 10 presents another example in which a user has selected Manhattan, another borough of New York City, and magnified a portion of the borough, thereby displaying a graphic representation of a select part of the gaming environment including a spatial representation 1000 of a landmass corresponding to the geography of Manhattan in accordance with some embodiments.

Figure 11:
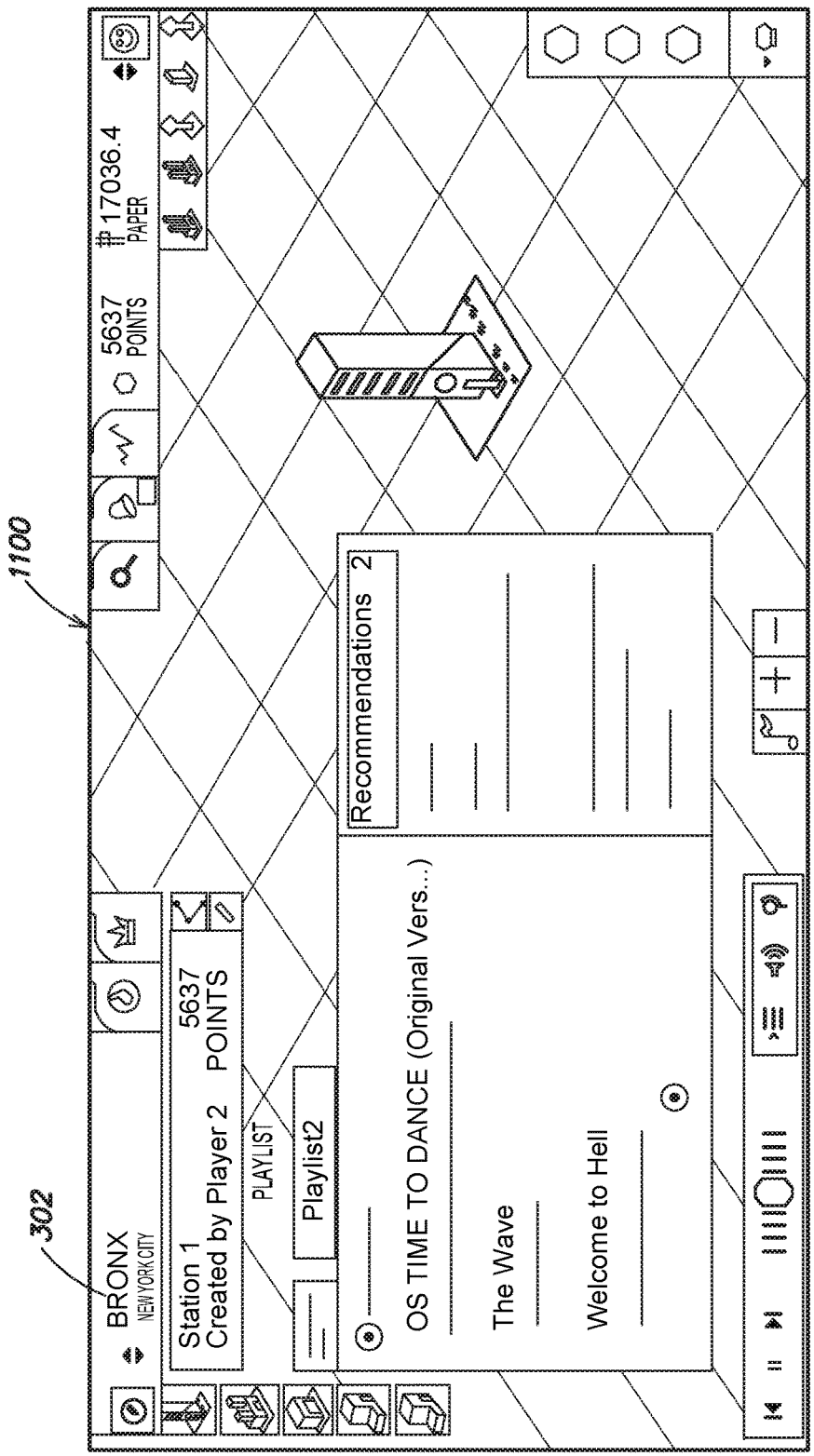
FIG. 11 is a graphic representation of at least part of a gaming environment including a magnified portion of a map corresponding to the geography of a second area and/or location in accordance with some embodiments.
Figure 13:
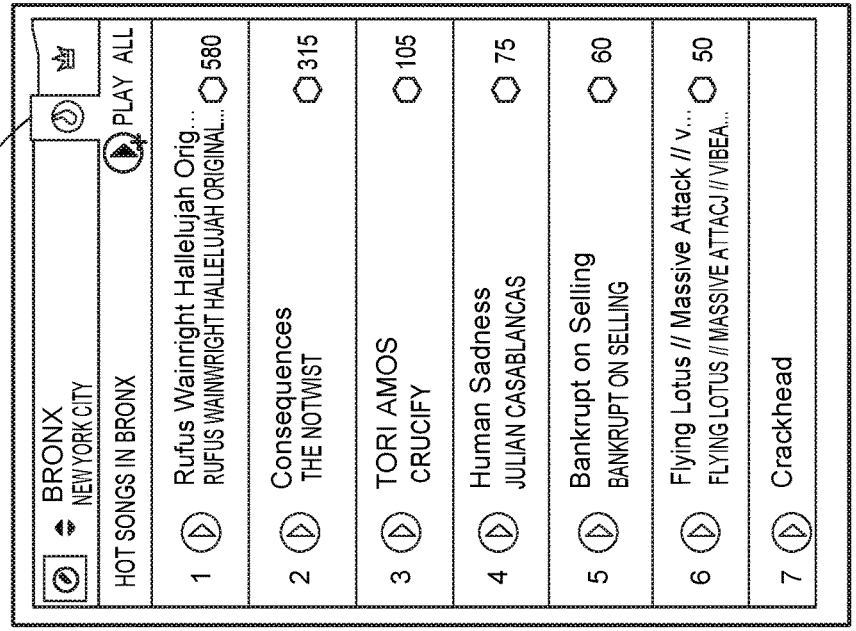
FIG. 13 is a graphic representation of at least part of a gaming environment including a drop-down menu of content in a particular geographic area and/or location for review and/or selection in accordance with some embodiments.
Figure 12:
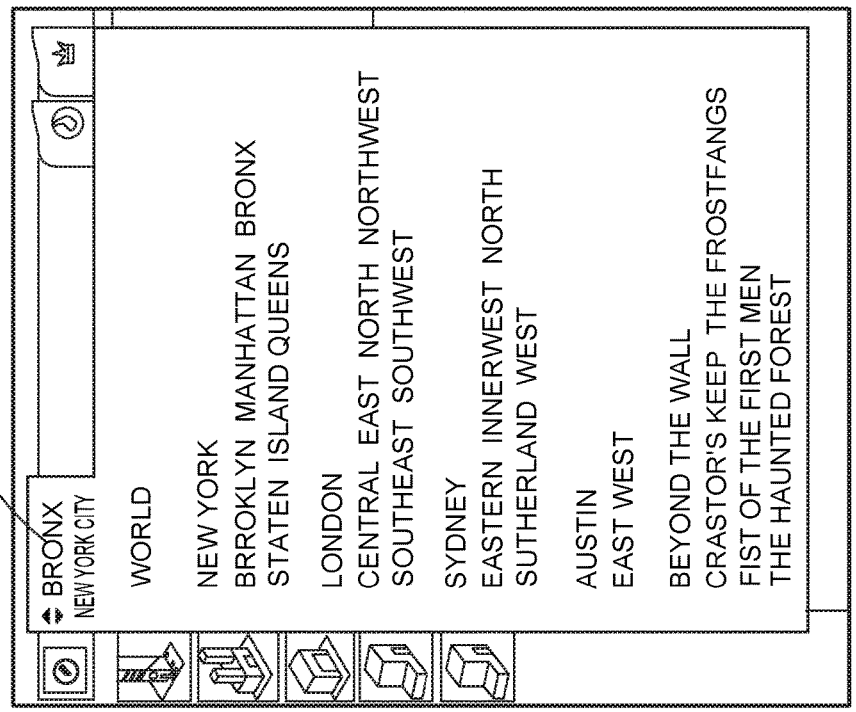
FIG. 12 is a graphic representation of at least part of a gaming environment including a drop-down menu of geographic locations for review and/or selection relative to a particular geographic area and/or location in accordance with some embodiments.

FIG. 11 presents another example in which a user has selected Bronx, yet another borough of New York City, and magnified a portion of the borough, thereby displaying a graphic representation of a select part of the gaming environment including a spatial representation 1100 of a landmass corresponding to the geography of Bronx in accordance with some embodiments. FIG. 12 is a graphic representation of at least part of a gaming environment including drop-down menu 302, which presents areas and/or locations of the gaming environment that either include Bronx (e.g., World or New York City) or exclude Bronx in accordance with some embodiments. In some embodiments, a user uses a user input device to view one or more rankings. In FIG. 13, a graphic representation of at least part of a gaming environment includes drop-down menu 304, which presents the most popular content (e.g., songs) in Bronx for viewing, consumption, etc., in accordance with some embodiments.

According to some embodiments, a user may use a user input device to shift (e.g., click and drag, scroll, etc.) and/or expand the area and/or location for viewing. A graphic representation may jump quickly to a new area and/or location, be it geography corresponding to the world, a particular city, a particular neighborhood, and/or a particular station/user/playlist of a gaming environment. A user also may elect to initiate a function that automatically relocates the graphic representation to a particular city, a particular neighborhood, and/or a particular station/user/playlist of a gaming environment from which the current song is playing.

Figure 14:
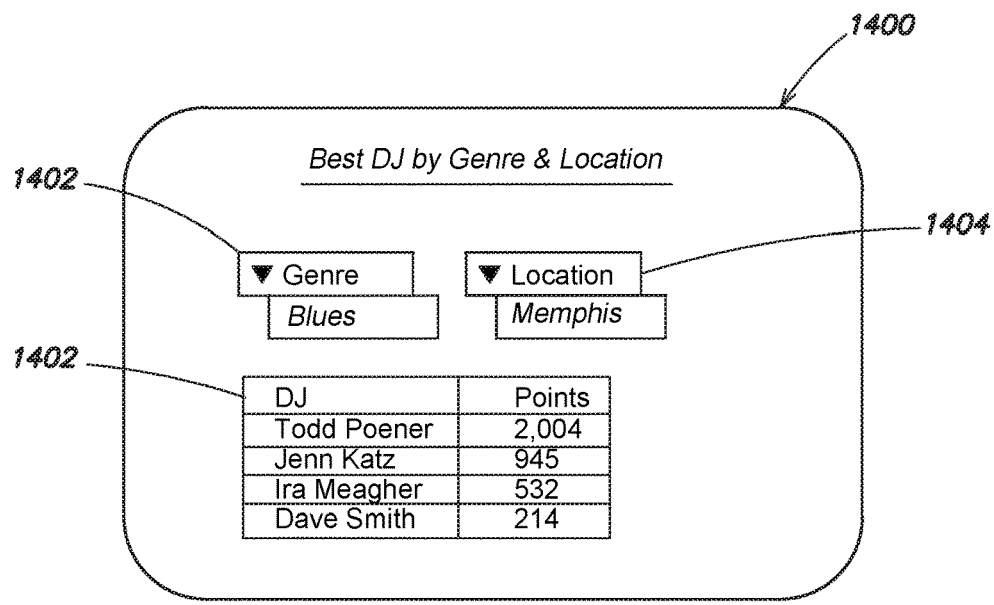
FIGS. 14-17 are graphic representations of at least part of a gaming environment illustrating a search for players and/or compositions filtered by, for example, at least one of associated rank, content type, and geographic area and/or location in accordance with some embodiments.

Shared content, user-generated/provided information and other modules within a gaming environment may be represented by, for example, visual means not limited to a spatial/map representation or restricted to organization by user location. In some embodiments, a gaming environment may be implemented with non-spatial representations. For example, content, information, and/or modules may be graphically represented by text-based drop-down menus and/or lists. FIG. 14 illustrates an example in which display 1400 indicates a search for the most successful registered user (i.e., "disc jockey" or "DJ") as determined, for example, by point total in accordance with some embodiments. Display 1400 includes selector 1402 to filter music content according to a genre (e.g., blues) as, for example, submitted by each user and/or automatically determined by an assessment of compositions in each user's associated playlist(s) in the gaming environment. Display 1400 also includes selector 1404 to filter music content according to a geographic area and/or location (e.g., Memphis) as, for example, submitted by each user and/or automatically determined by the gaming environment. Result chart 1406 is generated and displayed according to user selection of discrimination criteria selected by, for example, operation of selectors 1402 and 1404.

Figure 15:
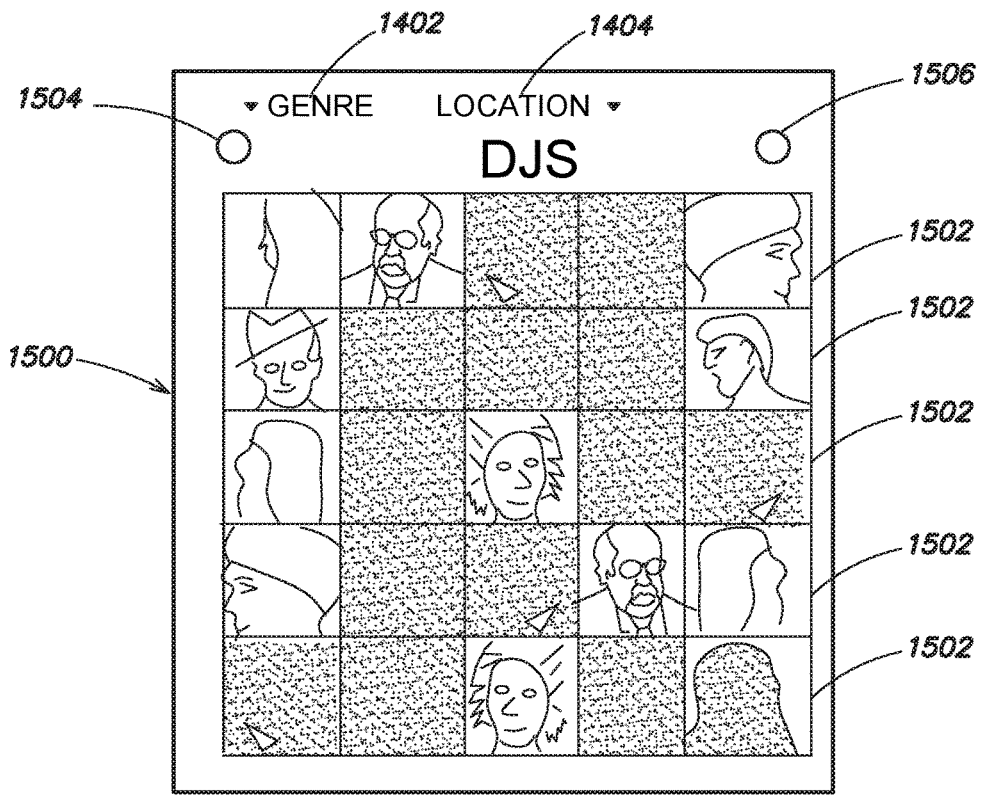

In some embodiments, content, information, and modules may be visually represented by one or more nodes that may contain images, links, or text. For example, content, information, and modules may be represented by tiled and/or cascaded images representing access to further content, information, or modules within the gaming environment. FIG. 15 illustrates an alternative example in which display 1500 indicates a search for the most successful registered user as determined, for example, by point total in accordance with some embodiments. Display 1500 includes a plurality of nodes 1502. Each node corresponds to a registered user and may be displayed as a user-submitted photograph, representative image, or avatar. Selection of a node may open, for example, a more detailed view of that user's profile or playlist(s). Nodes may also be configured to represent particular compositions. In FIG. 15, selector 1504 is used to specify nodes representing registered users, but selector 1506 is used to specify nodes representing compositions.

Figure 16:
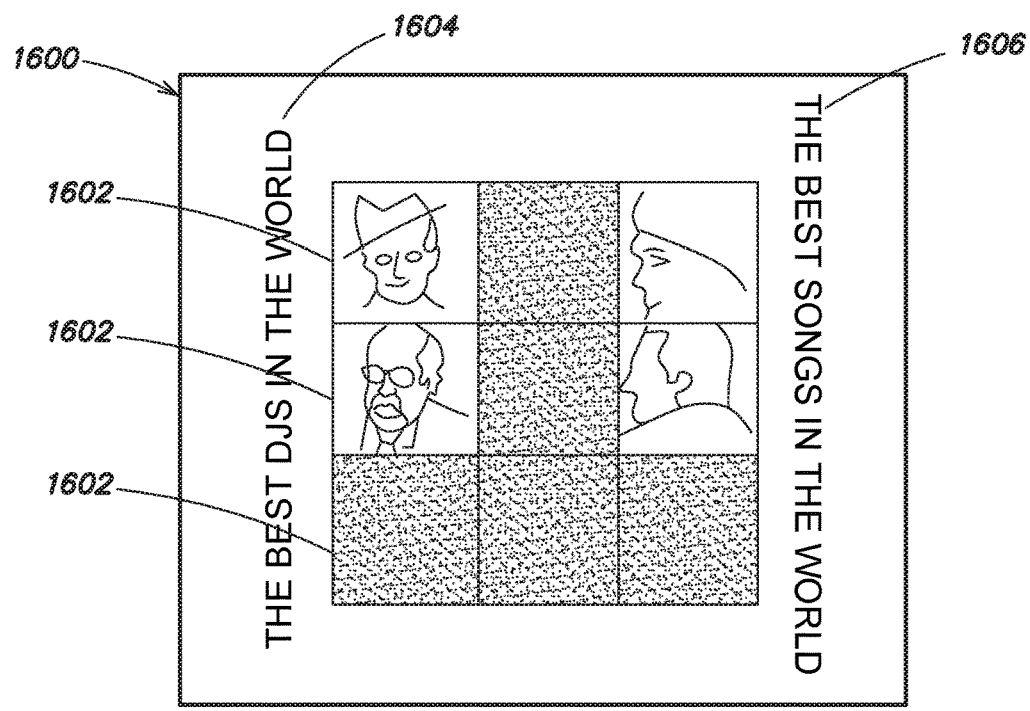

FIG. 16 illustrates another example in which display 1600 indicates a search for the most successful registered user and the most successful composition as determined, for example, by point total in accordance with some embodiments. Display 1600 includes a plurality of nodes 1602. Each node corresponds to pre-selected categories of either a registered user 1604 or a composition 1606.

Figure 17:
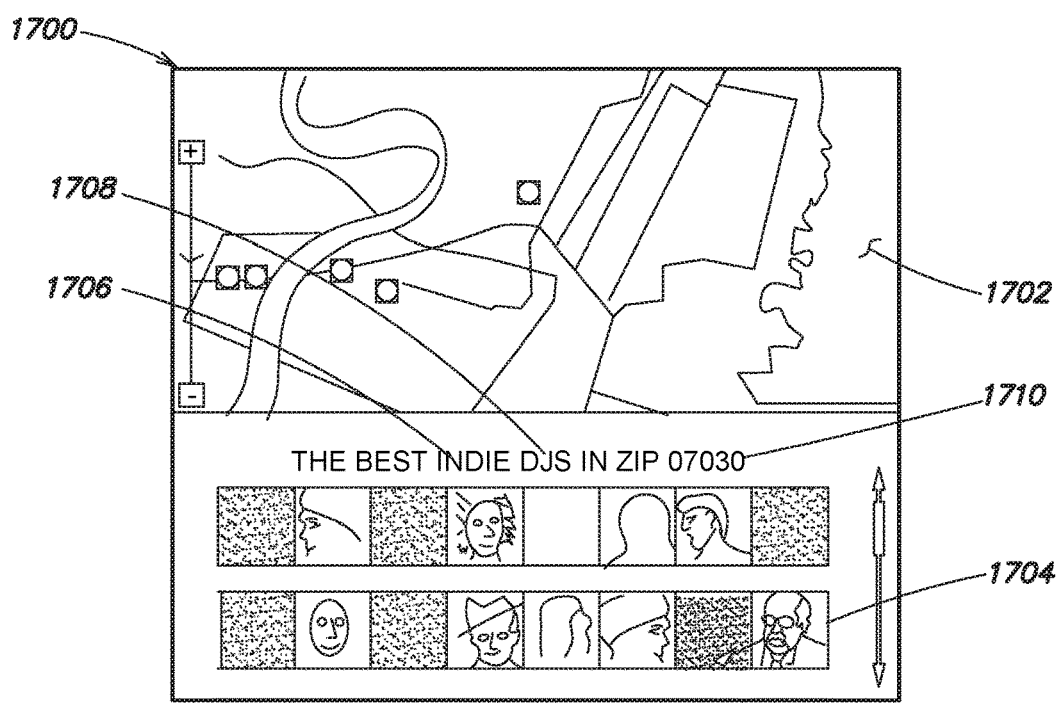

FIG. 17 illustrates another example in which hybrid display 1700 indicates a search for the most successful registered user as determined, for example, by point total, in a particular genre (e.g., indie), and within a geographical area (e.g., a zip code) in accordance with some embodiments. Display 1700 includes a map 1702 and geographically-related nodes 1704 that represent search results. User selections, including genre 1706, entity 1708 (e.g., registered user, playlist, and/or composition), and geographical area and/or location 1710 may allow a user to filter search results accordingly.

In another example, content, information, and/or modules within the gaming environment may be configured to be displayed atop a backdrop that may represent a particular user, a particular composition, particular geographical region, etc., and/or information relevant thereto. For example, an image of Istanbul may be configured as a background image in a display to represent that the current most popular composition in the gaming environment was discovered (e.g., introduced to the gaming environment) by a registered user located in Istanbul.

Figure 18:
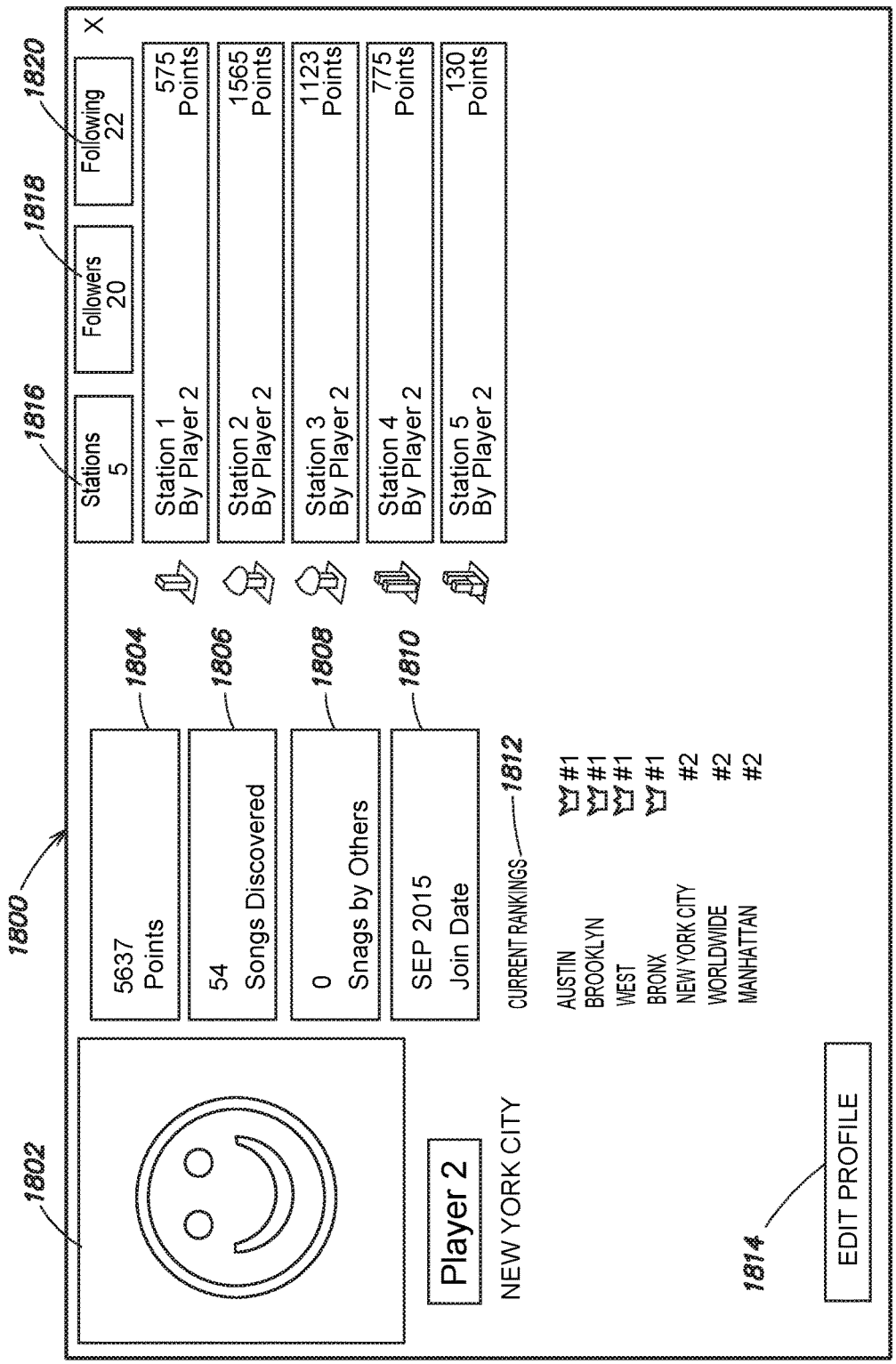
FIG. 18 is a graphic representation of a user profile associated with a gaming environment in accordance with some embodiments.

A user profile may be saved with or linked to information about a registered user, content preferences, apparatus setting, and associated activity within the gaming environment in one or more memory devices. FIG. 18 is a graphic representation of a user profile 1800 associated with a gaming environment in accordance with some embodiments. In FIG. 18, the user profile is for Player 2, who is located in New York City. The user profile includes a profile picture 1802, total points accumulated 1804, total number of compositions (e.g., songs) discovered 1806, total number of compositions (e.g., songs) snagged by others 1808, date of joining the gaming environment 1810, and current rankings of Player 2 in various geographic areas and/or locations 1812. A registered user may review, add, and/or modify profile information including, but not limited to, the user's username, real name, location, age, gender, occupation, education, and/or profile picture. In FIG. 18, selection of button 1814 may allow Player 2 to edit at least some of the profile information.

In some embodiments, a location associated with a user profile and content may be referred to as a station. A station, which may include one or more playlists of content, may have one or more "followers" (described further below). For example, a user profile may be configured to display identifications of other users who have "liked" that user's station and/or playlist, marked a composition from that user's station and/or playlist as a "favorite," added a composition from that user's station and/or playlist to their own playlists, purchased a composition from that user's station and/or playlist, etc. Similarly, a user's profile may be configured to display an indication of other stations and/or playlists which are also liked by users who like that user's playlist. In FIG. 18, Player 2's user profile is associated with five stations 1816. These stations 1816 are followed collectively by twenty other players or followers 1818. Player 2, in turn, is a follower of twenty-two stations 1820.

In some embodiments, a symbol, such as a graphical icon, text, or audio, is used to identify an exact or relative location associated with a user. For example, the presence of a registered user may be indicated by one or more symbols overlaid on a spatial representation or map of a graphic representation of the gaming environment. The one or more symbols may be static and/or dynamic. The locations of the one or more symbols relative to the spatial representation or map correspond to locations associated with the registered user.

In some embodiments, a graphical user icon is overlaid on a spatial representation, thereby occupying a location corresponding to a user's location. A graphical user icon may electronically link a graphical display to a corresponding user profile and/or a corresponding playlist. A graphical user icon may appear as a virtual world object, such as a building or house. In some embodiments, a user may "pay or play" (i.e., play to earn rewards, accrue points/status for rewards, exchange points for rewards, trade with other users for rewards, use points to purchase virtual currency to buy rewards, and/or pay directly with real and/or alternative currency like bitcoin for rewards) for the ability to customize his or her graphical user icon in one or more ways. For example, a user may modify a type of object, a color, a lighting effect, a size, a shape, and/or other characteristic of his or her graphical user icon either temporarily or indefinitely. Some characteristics may be determined based on an amount of points assigned to the corresponding user profile. Some characteristics may be determined based on purchases using points, in-app currency, real currency, and/or alternative currency. When many users' locations are plotted on the map, or other visual geographic display, which could include a list, tile or cascade of relevant images, users may be provided with the ability to browse, search, communicate with, or otherwise interact with other users and/or content other users make available.

In some embodiments, the multiplayer gaming environment includes content or a link to the content stored in at least one memory of at least one apparatus. Content may include information and experiences intended for an end-user, including but not limited to music, video, speech (e.g., comedy routines, podcasts, audiobooks, etc.), writing (e.g., poetry, short stories, news articles, etc.), and/or images (e.g., photographs, illustrations, etc.). The terms "music" and/or "song" are used herein merely as examples of a particular implementation of the present invention and are not limiting. In some embodiments, content may include promotions and sales of, for example, tickets to events. Independent items of audio and/or visual content may be referred to as compositions. The multiplayer gaming environment may include or be linked to a plurality of different compositions. For example, digital information may be communicated in numerous formats including MP3, WAV, AAC, MPEG, and AIFF files. Digital information also may be streamed in a suitably formatted data stream.

A gaming environment also may be configured such that users may promote audio and/or visual content to other users. For example, a user who promotes a composition, also referred to herein as a promoter, may upload the composition from a client (e.g., a user device) to a server device and publish a link to the composition for other users to follow (e.g., via a network such as the Internet). The server device may be the same as the server device that runs the gaming environment or a third party server. In another example, a promoter may provide a link to a composition's pre-existing storage location on a memory device, for example, in the gaming environment, for other users to follow. In addition to the import of the composition itself from a pre-existing storage location, related data may be similarly imported along with the composition. For example, meta-data about the composition (e.g., the author(s), content type, genre, publication date, and size) may be culled automatically from the composition, the composition's source, and/or via manual user input. In any event, a user may add content to a gaming environment and thereby provide access to other users.

The gaming environment may be configured to allow each user to establish one or more playlists of one or more compositions. The operating user may add and/or remove one or more compositions from a playlist. The number of playlists per user may be limited. In some embodiments, a user may "pay or play" (i.e., play to earn rewards, accrue points/status for rewards, exchange points for rewards, trade with other users for rewards, use points to purchase virtual currency to buy rewards, and/or pay directly with real and/or alternative currency like bitcoin for rewards) for the ability to increase the number of playlists allowed for that user. Similarly, the number of compositions per playlist may be limited. In some embodiments, a user may pay or play for the ability to increase the number of compositions allowed for that user and/or a particular playlist.

In one example, a playlist presents a command input, such as a link or button, which a user may select to experience a composition through one or more user output devices. In some embodiments, a user may populate a playlist by, for example, adding one or more compositions from another user's playlist. An "add" control may be associated with each composition in the gaming environment to facilitate adding compositions from other users' playlists.

According to some embodiments, a playlist or presence of a playlist may be graphically represented in a gaming environment with a symbol, such as an icon and/or text as shown in FIG. 2, described above. A playlist may be embedded within a display and/or appear as an overlay on a background graphic. Users may select an icon representing one or more playlists to open a widget (e.g., a container overlay) allowing the user to view content or information about the content. For example, a user input device may be used to operate cursor 204 to select symbol 206, thereby opening window overlay 208, which displays Playlist A consisting of Song 1 and Song 2. A playlist may be graphically displayed as a collection of compositions, but need not be displayed as a traditional list. A playlist may be a text-based list or a cascading or tiled-image. A playlist may be accompanied by, for example, text and/or other content. A playlist may include information about the compositions including, but not limited to, the author(s), content type, genre, publication date, and size. A playlist may also contain information about the playlist itself, such as, for example, the inspiration behind the playlist or a note about the playlist's history. For example, a user may establish a playlist of songs played by a particular band at a particular live show.

FIG. 19 is a graphic representation of a playlist in accordance with some embodiments. In FIG. 19, a fully displayed playlist includes information about, for example, the compositions (songs) comprising the playlist, the user who operates the playlist ("User 1"), the popularity (e.g., points) of the playlist, the individual popularity (e.g., points) of compositions on the playlist, a date the playlist was created or last updated, etc. Playlists may be displayed with controls for interacting with the playlist and compositions comprising the playlist. For example, a widget (e.g., the "Listen" button) may allow a user to begin experiencing the compositions in the playlist. A playlist may be provided such that users experience compositions in an order specified by, for example, the promoter and/or in a random order. A widget (e.g., a "Play" button) may be provided for each composition in a playlist for selective experience of individual compositions. A playlist also may be provided with controls for a first user to add a composition from a second user's playlist to a playlist operated by the first user. For example, a widget (e.g., the "Add" button) may be provided for each composition in a playlist for selective addition of individual compositions.

In some embodiments, a user may "like" or otherwise mark a user, station, composition, and/or playlist as a "favorite." In FIG. 19, for example, a widget (e.g., the "Like" button) may allow a user to mark the playlist as a favorite playlist. A user, station, composition, and/or playlist may earn points for being liked or marked as a favorite by another user.

In some embodiments, a user may "follow" one or more other users, stations, playlists, and/or compositions. By following one or more other users, stations, playlists, and/or compositions, a user may subscribe to receiving notifications and/or updates related to the one or more other users, stations, playlists, and/or compositions. The number of other users, stations, playlists, and/or compositions a user can follow may be limited. In some embodiments, a user may "pay or play" (i.e., play to earn rewards, accrue points/status for rewards, exchange points for rewards, trade with other users for rewards, use points to purchase virtual currency to buy rewards, and/or pay directly with real and/or alternative currency like bitcoin for rewards) for the ability to increase the number of other users, stations, playlists, and/or compositions that user may follow. In FIG. 19, for example, a widget (e.g., the "Follow" button) may allow a user to receive notifications and/or updates related to the playlist. A user, station, composition, and/or playlist may earn points for being followed by another user.

In some embodiments, a user may "bookmark" compositions for future experience. For example, by bookmarking one or more compositions, a user may add the one or more compositions to a queue without applying public approval. Bookmarks may be customized for different categories of content. Compositions tagged with bookmarks in one category may be used to populate a queue.

In some embodiments, a gaming environment is configured to allow a user to create a composition (e.g., an image, text, sound recording, and/or video recording) directly into a playlist. For example, a gaming environment may include a recording module configured to receive input from a user device. The recording module may be included as a standard function available to all users in the gaming environment. Alternatively, a user may "pay or play" (i.e., play to earn rewards, accrue points/status for rewards, exchange points for rewards, trade with other users for rewards, use points to purchase virtual currency to buy rewards, and/or pay directly with real and/or alternative currency like bitcoin for rewards) for the ability to earn a recording module. The size (e.g., file size) of user-generated compositions may be limited. In some embodiments, a user may pay or play for the ability to increase the size of user-generated compositions allowed for that user. In some embodiments, a user-generated composition may be added to the user's playlist and therefore assume some or all of the functionalities of a composition in the gaming environment (e.g., accrue points, be added to playlists by other users, etc.). A user-generated composition may be visually differentiated from non-user-generated compositions in a display. In other embodiments, a user-generated composition is "hidden" from one or more other users. A user-generated composition may include, but is not limited to, an advertisement, personalized message (e.g., a "bump" about the user and/or the playlist), and/or an introduction to a particular composition.

In some embodiments, a gaming environment is configured for censorship of user-generated compositions. For example, a game administrator may be enabled to remove and/or prevent sharing of a user-generated composition such as explicit language or provocational or incendiary comments toward other users in the gaming environment. A gaming environment may allow for users to report or flag objectionable compositions to a game administrator.

A user who operates one or more playlists may choose to allow another user or other users to access, control, and/or populate any or all of their playlists. In some embodiments, a user maintains more than one playlist. Multiple playlists may be accessed by a user by using widgets, for example, to select a playlist from a drop-down menu of playlists or otherwise switch from a first playlist to a second playlist with one or more command keys, touch-screen capabilities, voice-recognition capabilities, and/or other input devices. A user may select and/or modify one playlist as the default playlist. In some embodiments, a user who operates multiple playlists may be provided with the ability to move points accrued by a first playlist into a second playlist' point register in order to, for example, "unlock" certain achievements for the second playlist. If a user has established a very popular playlist and has earned, purchased, and/or otherwise acquired the capacity to operate and populate a new playlist, the user may allot points to that new playlist in order to accelerate the rate at which that new playlist accrues points toward incentives or rewards.

FIG. 20 is a graphic representation of a user station with more than one playlist in a gaming environment in accordance with some embodiments. In FIG. 20, Station 3 created by Player 2 includes more than one playlist. Each playlist may be accessed by selecting a tab. For example, Playlist 5 has been selected for display. The playlist includes information about, for example, the number of compositions comprising the playlist (9 songs), the individual compositions (e.g., song titles and performer(s)), the individual popularity (e.g., points) of each composition, the popularity (e.g., points) of the playlist as a whole, and a date the playlist was created or last updated. The playlist also is displayed with controls for interacting with the playlist and compositions comprising the playlist. For example, a widget (e.g., the "Play All" button) may allow a user to experience the compositions in the playlist in an order specified by the promoter and/or in a random order.

A user may choose not to populate a playlist but may browse, experience, follow, and/or otherwise interact with other users regarding the content the other users make available. In some embodiments, a user is provided with an option for activating "random play" for output of randomly-selected compositions, for example, meeting user-defined parameters (e.g., a content type, genre, author, and/or geographic area and/or location associated with the discovering user). Selection may also take into account other factors including, but not limited to, the popularity (e.g., points) of a composition and the how long the composition has been available in the gaming environment. Compositions may be selected from playlists owned by other followed users as well as other sources. For example, a gaming environment may be configured to automatically analyze a user's playing, following, liking, adding, and/or purchasing habits to suggest or determine content preferences. Compositions may be randomly selected from other users and playlists throughout a gaming environment, regardless of any previous connection (or lack thereof) to the user, or based on a playlist that another user has played, followed, liked, added, and/or purchased. A user may be presented with an option to skip a composition or may be prohibited from skipping the composition.

Figure 21:
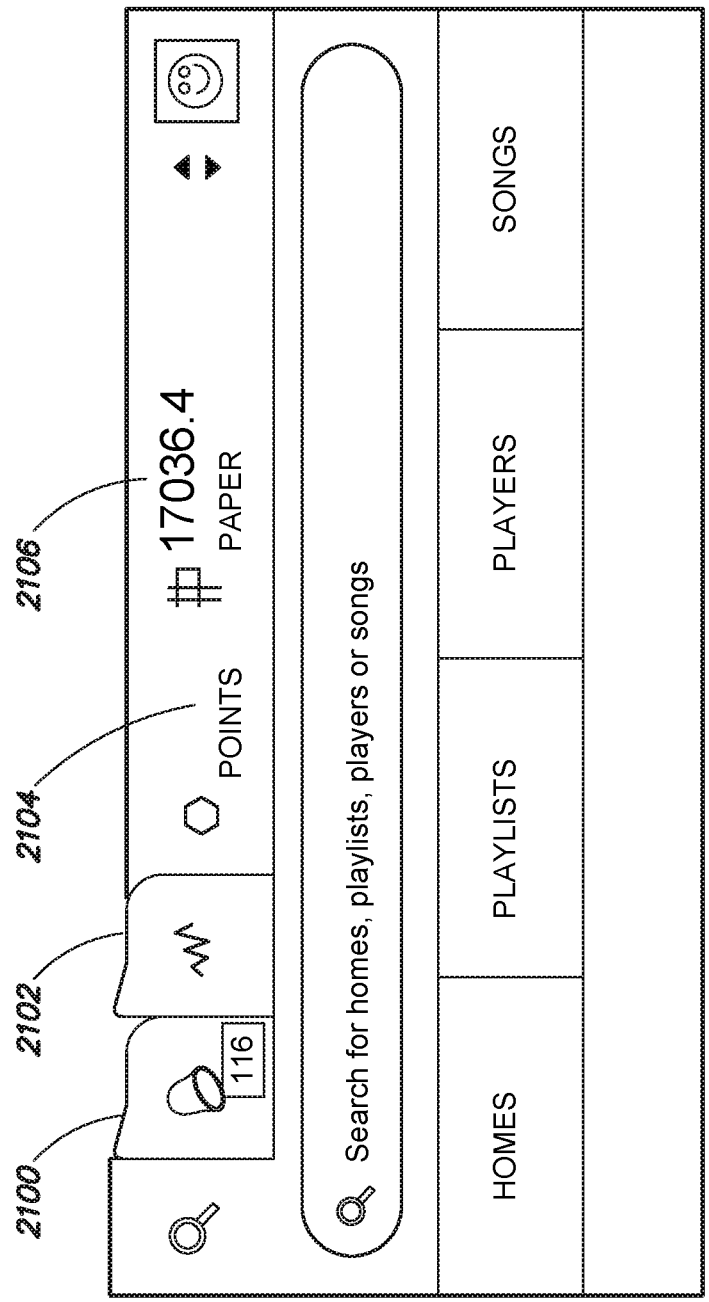
FIG. 21 is a graphic representation of features in a gaming environment in accordance with some embodiments.
Figure 22:
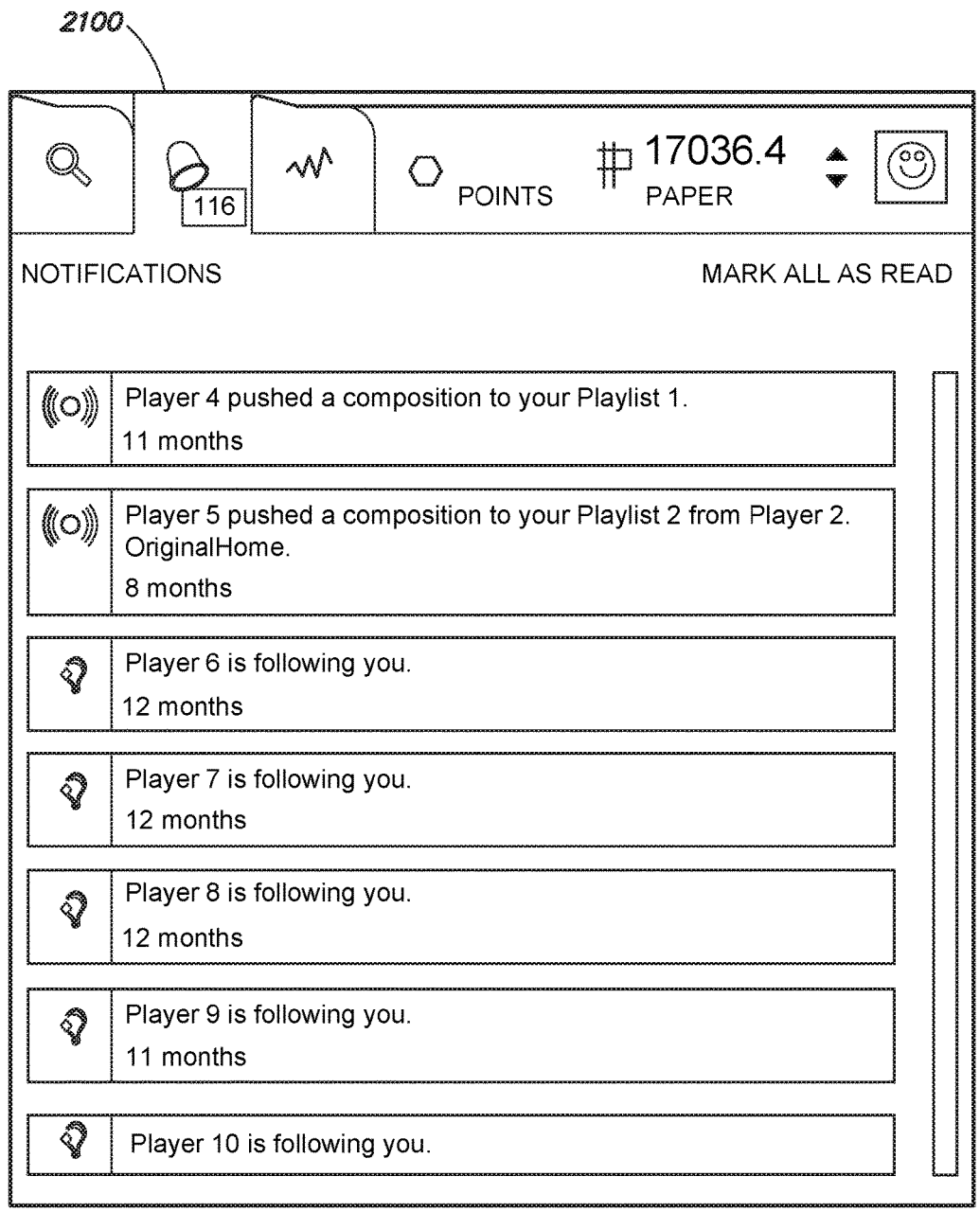
FIG. 22 is a graphic representation of user notifications associated with a gaming environment in accordance with some embodiments.

FIG. 21 is a graphic representation of features in a gaming environment in accordance with some embodiments. In some embodiments, a user may select an icon to open a widget (e.g., a container overlay) allowing the user to view one or more notifications. For example, a user input device may be used to select tab 2100, thereby opening a container overlay displaying a list of user-specific notifications in the gaming environment for review. FIG. 22 is a graphic representation of user notifications associated with a gaming environment in accordance with some embodiments. The notifications may be a real-time activity log, tracking and reporting when a user is being followed, targeted by a gaming item, etc.

In FIG. 21, a user input device may be used to select tab 2102, thereby opening a container overlay displaying a list of user gaming items in the gaming environment for review. FIG. 23 is a graphic representation of user item performance associated with a gaming environment in accordance with some embodiments. Items (discussed further below) may have performance factors for user review including, but not limited to, how long each item lasted, how many points the item secured, from which other user/station/playlist points were earned, and how long ago the item became deactivated. In some embodiments, if another user/station/playlist is displayed, the user may select and navigate directly to that user/station/playlist.

In some embodiments, a point system is integrated into a gaming environment to, for example, incentivize user behavior and/or track content popularity. A point register may be assigned to each user, station, playlist, composition, geographical area, etc. Points may be redeemable for prizes and/or game items. Points also may be used to organize or rank users, stations, playlists, compositions, geographical areas, etc. In FIG. 21, a user's interface with the gaming environment includes a point register 2104 for the user and an in-app currency account 2106.

For example, a first user may be assigned one or more points for uploading a composition, adding a composition to a playlist, selecting a composition/playlist shared by at least one second user, interacting with at least part of a composition/playlist (e.g., experiencing at least a predetermined fraction of the composition and/or interacting with the composition for at least a predetermined amount of time) shared by at least one second user, liking a composition/playlist shared by at least one second user, "disliking" a composition/playlist shared by at least one second user, following at least one second user or the second user's station/playlist, buying a composition from a vendor and/or from the game provider via a link provided in the gaming environment, sharing a composition added by at least one second user, sharing a composition/playlist selected by at least one second user, sharing a composition/playlist at least part of with which at least one second user interacts, sharing a composition/playlist liked by at least one second user, being followed by at least one second user, and/or operating a station/playlist followed by at least one second user. One or more points may be removed from the first user's register for sharing a composition/playlist disliked by at least one second user, no longer being followed by at least one second user, and/or operating a station/playlist no longer followed by at least one second user. Accordingly, users may be ranked relative to one another locally or globally based on the number of points they have accrued.

Compositions also may accrue points. For example, a composition may be assigned one or more points for being shared on a first playlist, added from a first playlist to a second playlist, selected by at least one user, at least partially interacted with by at least one user, liked by at least one user, and/or purchased by at least one user from a vendor and/or from the game provider via a link provided in the gaming environment. One or more points may be removed from the composition's register for being disliked by at least one user, removed from at least one playlist, and/or selected too infrequently. Accordingly, compositions may be ranked relative to one another locally or globally based on the number of points they have accrued.

Playlists also may accrue points. For example, a playlist may be assigned one or more points for being selected by at least one user, at least partially interacted with by at least one user, liked by at least one user, and/or followed by at least one user. One or more points may be removed from the playlist's register for being disliked by at least one user and/or no longer being followed by at least one user. Accordingly, playlists may be ranked relative to one another locally or globally based on the number of points they have accrued.

Stations also may accrue points. For example, a station may be assigned one or more points for being selected by at least one user, at least partially interacted with by at least one user, liked by at least one user, and/or followed by at least one user. One or more points may be removed from the station's register for being disliked by at least one user and/or no longer being followed by at least one user. Accordingly, stations may be ranked relative to one another locally or globally based on the number of points they have accrued.

Points may hold their value over time, or points may be configured to decay in value over time. That is, points may have a predetermined life span or a reduced value over time. For example, a point may remain in a register only for a week until it is removed. As another example, a point in a register may decrease in value from a full point by some percentage (e.g., about 1% to about 10%) per day until the point is fully removed from the register. In another example, all points in a register periodically may be completely removed.

The presence or lack of a predetermined amount of points in a register over time may have consequences for the associated user, station, playlist, and/or composition. For example, a user with a sustained large amount of points in their associated register may be offered VIP status and/or advertising opportunities, either automatically once they maintain at least a predetermined amount of points in their register for at least a predetermined period of time or as a result of a manual review. As another example, a composition may be removed from a playlist if it fails to maintain or achieve a predetermined amount of points in its associated register. Similarly, a playlist, station, and/or user may be automatically removed if the playlist, station, and/or user fails to maintain or achieve a predetermined amount of points.

User, station, and/or playlist points may indicate popularity or success. In some embodiments, these points may be redeemed for merchandise (e.g., stickers or apparel), game items, and/or game enhancements. In some embodiments, merchandise, game items, and/or game enhancements may be purchased.

Game enhancements may include, but are not limited to, more compositions allowed per playlist, more playlists allowed per station, more stations allowed per user, user profile page customizations, and/or game environment graphic representation customizations (e.g., virtual world objects representing a user/station/playlist on a map).

In some embodiments, a badge may be awarded to a user's station and/or playlist and/or display of the station and/or playlist may be enhanced to indicate the successful accomplishment of a point total or other predetermined achievement. For example, a user's playlist may be provided with a badge to indicate a "Top 5" ranking among other playlists in a geographic area, the playlist having exceeded a predetermined point level at one time or in its lifetime, etc. Compositions also may be awarded badges and/or be displayed with enhancements based on a point total or other predetermined achievement. For example, a banner may be configured to identify the "top composition in the world" based on points and/or other information. The banner may also display information indicating how long that composition has been entitled to a superlative identification, for example, a display of "time at the top."

A user may "pay or play" (i.e., play to earn rewards, accrue points/status for rewards, exchange points for rewards, trade with other users for rewards, use points to purchase virtual currency to buy rewards, and/or pay directly with real and/or alternative currency like bitcoin for rewards) for the ability to customize his or her interface with the gaming environment. An example of a customized interface would be a visual representation of content and information within a network that is organized atop a user-contributed or user-defined static or animated image (e.g., a family photo). A customized interface may be configured to allow a user to organize the display of nodes, modules, menus, content, and/or information within the gaming environment in such a way as to suit their browsing, searching, sharing, and interacting preferences. For example, a user may be enabled to organize nodes, modules, menus, content, and/or information in a way that resembles a virtual desktop or network.

Figure 24:
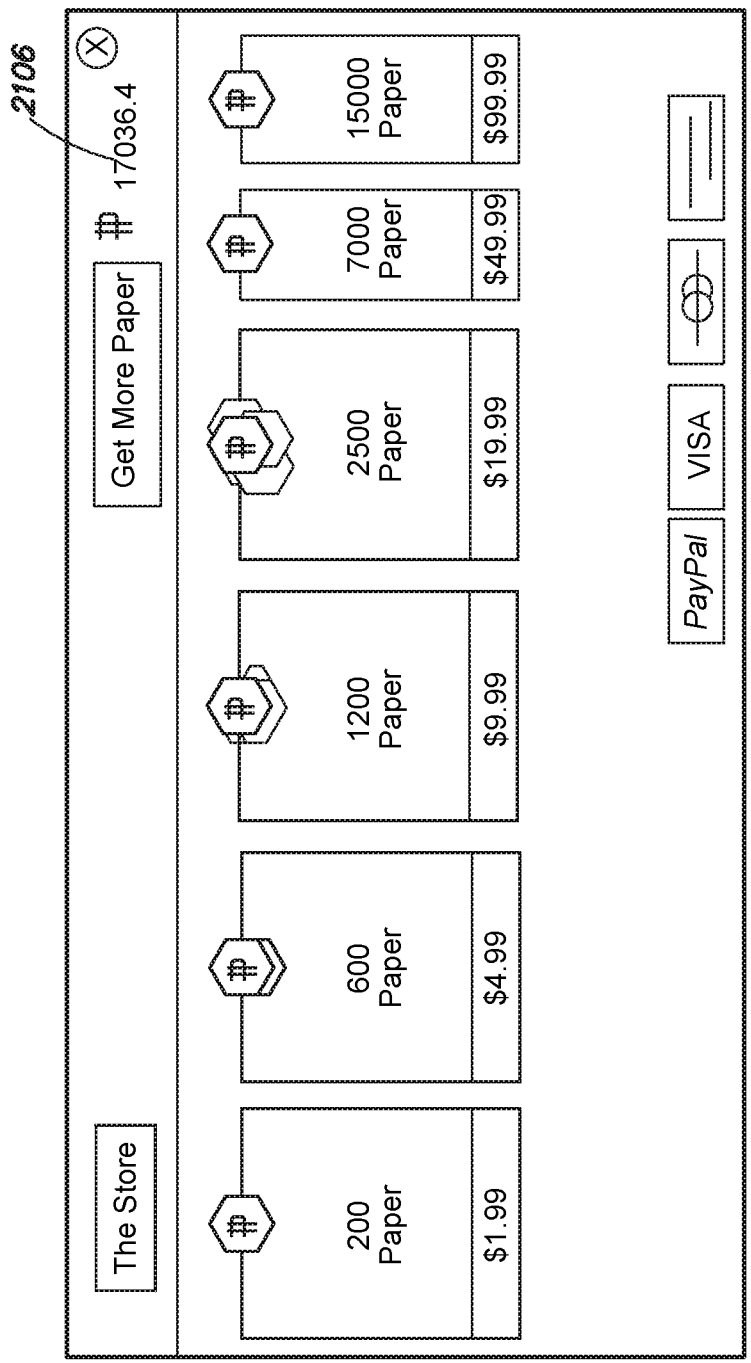
FIG. 24 is a graphic representation of a store for items associated with a gaming environment in accordance with some embodiments.

FIG. 24 is a graphic representation of a store for in-app currency associated with a gaming environment in accordance with some embodiments. The in-app currency may be purchased then exchanged for gaming items and/or enhancements.

Figure 25:
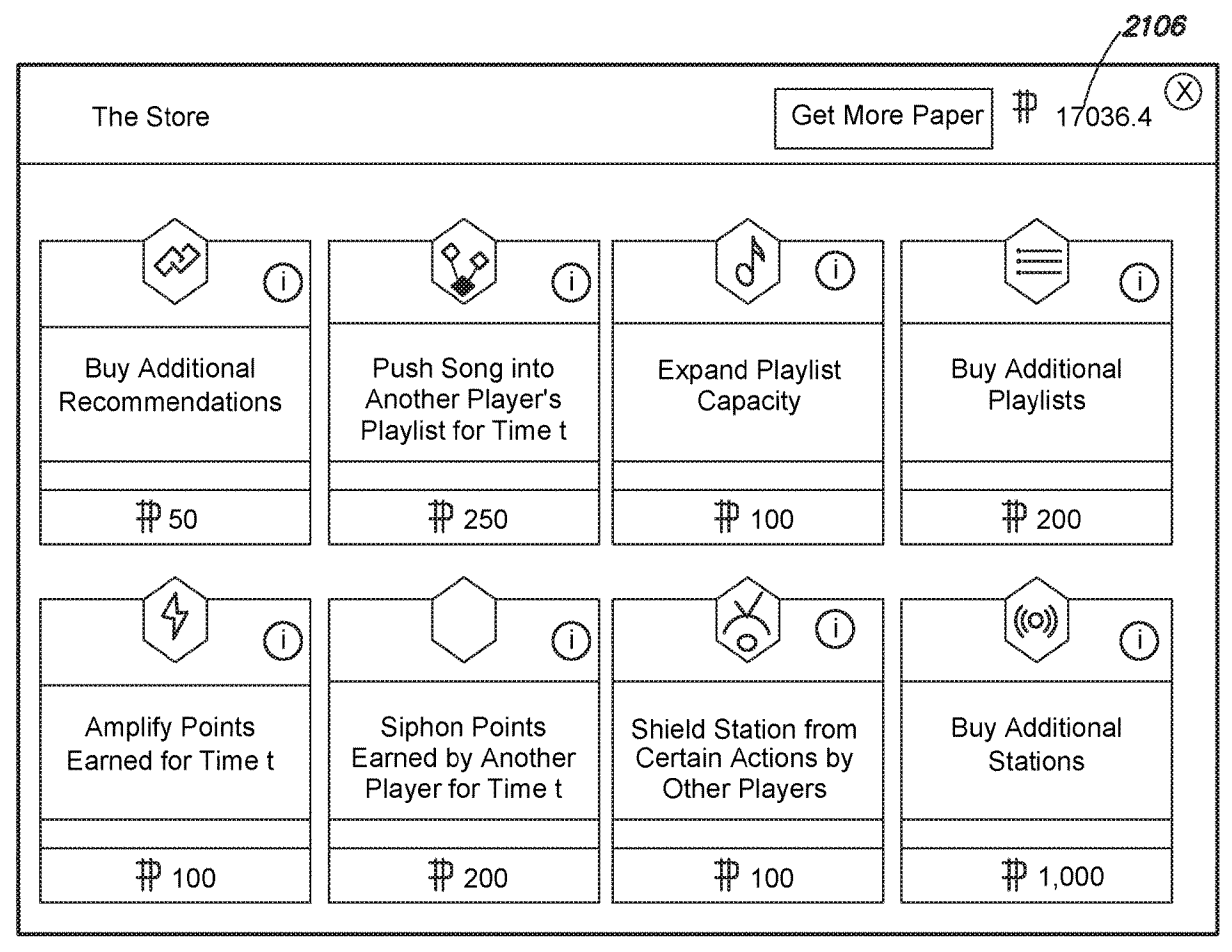

FIG. 25 is a graphic representation of a store for items associated with a gaming environment in accordance with some embodiments. The first item a user may "pay or play" (i.e., play to earn rewards, accrue points/status for rewards, exchange points for rewards, trade with other users for rewards, use points to purchase virtual currency to buy rewards, and/or pay directly with real and/or alternative currency like bitcoin for rewards) for in FIG. 25 is the ability to buy additional recommendations.

Recommendations are content that a first user recommends to a second user based on a playlist. In accordance with some embodiments, recommendations are peer-to-peer and not generated by algorithms. Recommendations may be publicly viewable and function both as a distribution mechanism and curation tool. The second user (i.e., the recipient of the recommendation) may have the option to remove the recommendation. Recommendations may earn the recommending user points upon each selection and/or interaction with the recommended content. One or more recommendations may be allocated to each registered user periodically (e.g., each day); however, registered users may purchase additional recommendations.

FIG. 26 is a graphic representation of a playlist and recommendations for the playlist in a gaming environment in accordance with some embodiments. In FIG. 26, recommendation list 2600 is displayed adjacent to playlist 2602. Recommendation list 2600 includes four direct and public recommendations for songs to include in playlist 2602.

The second item a user may pay or play for in FIG. 25 is the ability to push a composition into another user's playlist for a particular period of time. Unlike a recommendation, the pushed composition is directly inserted in the playlist. Display of a pushed composition may be at the top of the playlist and/or highlighted for enhanced visibility. The duration may be predetermined, scaled, or random. In some embodiments, a user may spend additional in-app currency in order to "roll again" to potentially receive a longer duration. Points earned by the recommended composition may be awarded to the user who pushed the composition or split between the user who pushed the composition and the user who operates the playlist.

The third item a user may pay or play for in FIG. 25 is the ability to expand the capacity of a playlist. Upon registration, each user is provided an empty playlist for comprising a predetermined number of songs (e.g., about one to about twenty compositions). By spending a certain amount of (earned or purchased) in-app currency, a user may continue to expand the capacity of a playlist, for example, in increments (e.g., about one to about ten compositions at a time).

The fourth item a user may pay or play for in FIG. 25 is the ability to buy additional playlists for use as described above.

The fifth item a user may pay or play for in FIG. 25 is the ability to amplify the rate at which the user earns points for a particular period of time by, for example, a particular multiple. The rate may be predetermined, scaled, or random. The duration may be predetermined, scaled, or random. In some embodiments, a user may spend additional in-app currency in order to "roll again" to potentially receive a higher rate and/or longer duration. The ability to amplify the rate at which the user earns points may apply to a particular composition, playlist (including all the compositions therein), station (including all the playlists and compositions therein), and/or all of the user's activities (including all stations).

The sixth item a user may pay or play for in FIG. 25 is the ability to siphon points earned by another user at a particular rate for a particular period of time. The rate may be predetermined, scaled, or random. The duration may be predetermined, scaled, or random. In some embodiments, a user may spend additional in-app currency in order to "roll again" to potentially receive a higher rate and/or longer duration. The ability to siphon points may apply to a particular composition, playlist (including all the compositions therein), station (including all the playlists and compositions therein), and/or all of the other user's activities (including all stations).

The seventh item a user may pay or play for in FIG. 25 is the ability to shield a station for a particular period of time, thereby preventing other users from pushing a composition into a playlist and/or siphoning points. The duration may be predetermined, scaled, or random. In some embodiments, a user may spend additional in-app currency in order to "roll again" to potentially receive a longer duration.

The last item a user may pay or play for in FIG. 25 is the ability to buy additional stations for use as described above.

In some embodiments, a user may "pay or play" (i.e., play to earn rewards, accrue points/status for rewards, exchange points for rewards, trade with other users for rewards, use points to purchase virtual currency to buy rewards, and/or pay directly with real and/or alternative currency like bitcoin for rewards) for the ability to occupy a landmark on a graphic representation of the gaming environment. For example, a gaming environment that includes a map of Manhattan may also include the following landmarks as virtual objects overlaid and located on the map: the Apollo Theater (uptown), the Empire State Building (midtown), and the World Trade Center (downtown). A landmark is intended to be recognizable and may be scaled up for ease of viewing. In some embodiments, a competition may be held, the winner of which will inhabit the landmark for a period of time.

Competitions may include best composition or playlist (by, e.g., content type and/or genre). Each user may nominate a composition. As other users interact with the composition, it earns competition points, which are used for ranking purposes. Special quality meters may be supplied for more accurate quality ratings.

Competitions also may include trivia as well as auto-generated missions for instant rewards in exchange for completing tasks. An auto-generated mission may require interacting with a particular content type in a particular geographic area, from a particular genre, and/or associated with a user on the leaderboard. Alternatively or in addition, an auto-generated mission may require visiting a user, recommending a composition, using a game item, changing or adding a composition to a playlist, following a user, changing or adding profile information, etc.

In some embodiments, rewards may include the ability to affect stations and playlists on a broader scale. For example, a user may "pay or play" (i.e., play to earn rewards, accrue points/status for rewards, exchange points for rewards, trade with other users for rewards, use points to purchase virtual currency to buy rewards, and/or pay directly with real and/or alternative currency like bitcoin for rewards) for the ability to force a particular composition into the queues of all of the users with stations within a particular geographical radius. The radius may be predetermined, scaled, or random. In another example, a user may pay or play for the ability to siphon points from all of the users with stations within a particular geographical radius for a particular period of time. The radius and/or duration may be predetermined, scaled, or random. In yet another example, a user may pay or play for the ability to spawn copies of the user's station within a particular geographical radius. The radius may be predetermined, scaled, or random.

In some embodiments, a user may "pay or play" (i.e., play to earn rewards, accrue points/status for rewards, exchange points for rewards, trade with other users for rewards, use points to purchase virtual currency to buy rewards, and/or pay directly with real and/or alternative currency like bitcoin for rewards) for a feature that increases the rate at which points are earned and/or the rate at which constructions of a representative virtual world object (e.g., a house) take place.

In some embodiments, a plurality of users may collaborate, thereby generating an engaging way to work in a social and cross-cultural setting. Group curation of a playlist and/or station with multiple playlists may provide a primary or supplemental source of points for the plurality of users. Each group member may receive a share of points earned by the playlist and/or station. Group members may contribute points, in-app currency, gaming items, and abilities to the group's efforts. Group competitions may facilitate group curation, and leading groups may be recognized according to one or more separate ranking systems.

In some embodiments, a graphic representation of activity and trending content may be provided to identify geographic areas and/or locations with the most activity. A graphic representation also may be used to show a composition's geographic journey from discovery.

In addition to the point system, other information may be recorded in response to the occurrence of certain events. For example, when a command is received by a server from a client, the server may be configured to store a log of the event which may include, for example, a time and/or day of the request and location or other demographic information of the requesting user. An event log may be formatted in a database or other suitable data structure. Content may be evaluated and compared for popularity within a given geographic area or among users of a certain demographic. Such comparison may form the basis for generating a graphic display such as a chart which compares the relative popularity of content within a certain geographic area or among a certain demographic of user. In addition, the popularity of content may be recorded and compared within a certain type of content and/or genre. For example, a chart of popular songs may be generated only for those songs which are classified as country songs. Content producers and others may be interested in learning which types of content and venues are popular in a given area, among a given user demographic, at a given time, etc.

Map-based plotting of user and content information allows, for example, collection and display of back-end data on users, content, and/or locations as well as generation of suggestions (e.g., relevant advertisements) based on a particular user's location and/or content preferences.

Advertising may be integrated into the gaming environment. For example, advertisements may be inserted into playlists and/or displayed at specified times during a user's interaction with the gaming environment. Data mining may be used to tailor placement of advertisements for a specific goal.

An advertisement may take the form of static, dynamic, and/or interactive text. For example, a scrolling text bar or "ticker" may be graphically overlaid atop a display. Textual advertisements may be interactive (e.g., responsive to a user's selection of text). A ticker may include hyperlinks to web pages maintained by the advertiser.

Figure 27:
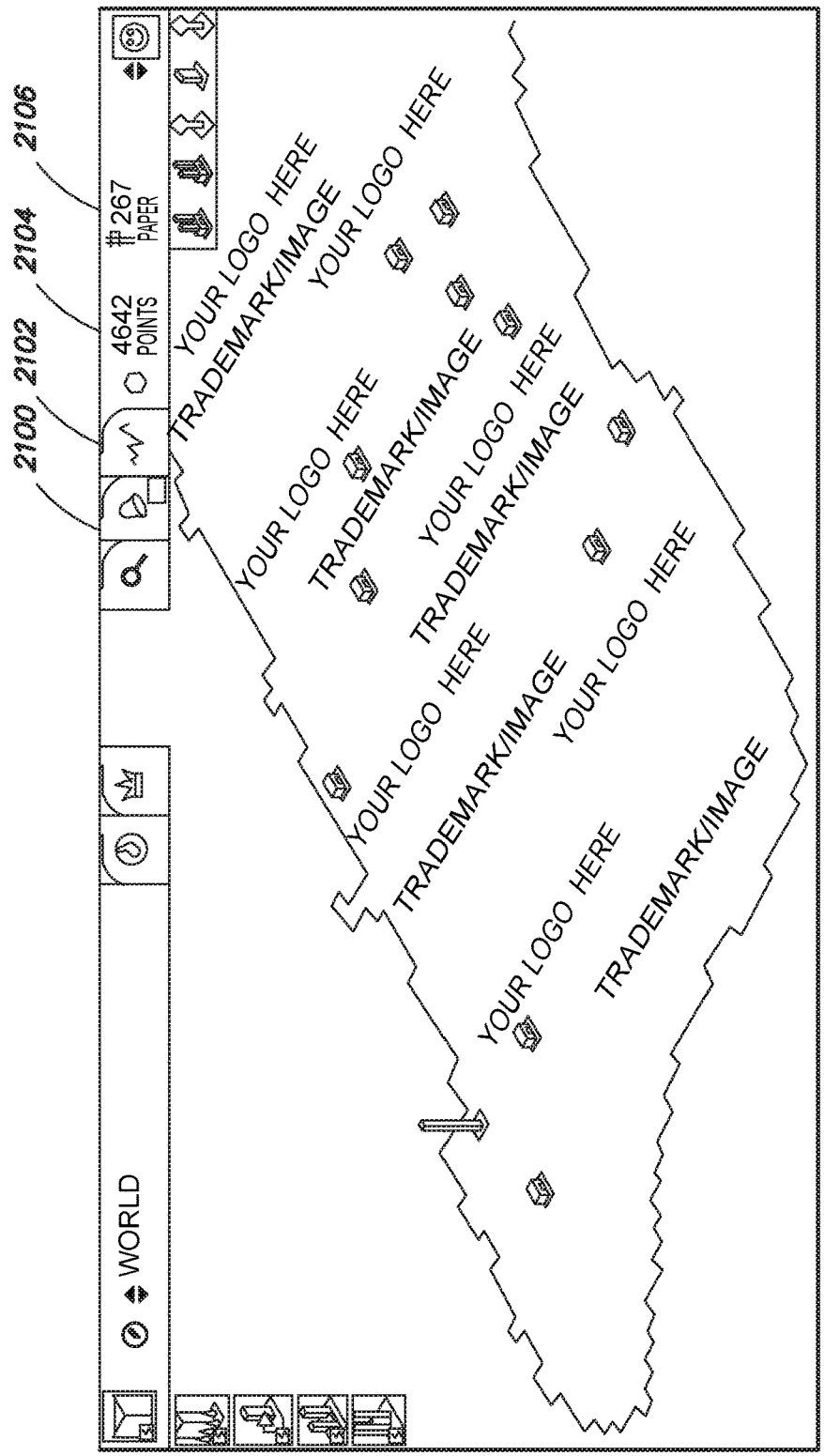
FIG. 27 is a graphic representation of at least part of a gaming environment including an advertising overlay on a magnified portion of a map corresponding to the geography of an area and/or location in accordance with some embodiments.

An advertisement may take the form of a graphic overlay and/or watermark. For example, an advertiser whose product has a distinctive trade dress (e.g., a candy bar wrapper or soda can) may present an advertisement in which a user's playlist takes the form of the product's trade dress. In another example, graphic advertisements may be presented as overlays and/or watermarks on a graphic representation of a gaming environment (e.g., on a map or another interface element). The overlay and/or watermarked area may be defined by, for example, a number of tiles, a particular radius, neighborhood boundaries, borough or city boundaries, and/or may encompass the entire world map. FIG. 27 is a graphic representation of at least part of a gaming environment including an advertising overlay on a magnified portion of a map corresponding to the geography of an area and/or location in accordance with some embodiments.

In some embodiments, users themselves may have options for seeking advertisements for their associated stations/playlists in return for additional points, in-app currency, and/or monetary compensation. For example, a user with a popular playlist may be presented with the option of selecting an advertiser's skin for their playlist in return for a predetermined amount of points. The points attributed to the selection of the playlist skin may be transferred in a single deposit or may be configured to accrue over time or with the completion of certain goals of the playlist. Points for advertisement skins may be added to a playlists' or user's associated point register each time (or once every specific number of times) another user views the playlist, plays a song on the playlist, etc.

An advertisement may take the form of a virtual world object. For example, an object overlay with an advertisement may be displayed moving relative to a graphic representation of at least part of a gaming environment. The object may vary in type, size, and/or appearance (e.g., a water vehicle like a boat appearing to float in bodies of water adjacent to a landmass on the map, a land vehicle like a tour bus appearing to travel across a landmass on the map, or an aerial object like a hot air balloon or cloud appearing to drift across the map). Advertisers may use such virtual world objects to interact with users by, for example, curating playlists of content, soliciting content curation from users and implementing competitions (potentially in exchange for badges), and integrating special content, promotions, and sales.

In some embodiments, a multiplayer gaming environment discourages continuous passive content consumption (e.g., streaming content) and/or encourages active engagement with at least some of the features of the gaming environment (e.g., rating or sharing content). Without registration, a user may be permitted to consume some depletable content and/or content for some depletable amount of time, but may be prompted to sign up in order to consume additional content and/or content for additional time. Registered users may "pay or play" (i.e., play to earn rewards, accrue points/status for rewards, exchange points for rewards, trade with other users for rewards, use points to purchase virtual currency to buy rewards, and/or pay directly with real and/or alternative currency like bitcoin for rewards) for additional content and/or time, including but not limited to a la carte options or a subscription package, such as unlimited content for a determined period of time.

Content and/or time may be allocated to each registered user periodically (e.g., each day); and content and/or time allotments may regenerate at one or more rates up to one or more maximum levels depending on user status. For example, depletion of content and/or time allotments may be determined by applying a factor to a base rate of depletion. In some embodiments, the amount of content or time allotted to a user before prompting the user to replenish may vary based on factors including, but not limited to, whether the user is consuming content curated by the user (e.g., the user's own playlist), a radio-like continuous stream of content, or content curated by another user and discovered by and/or recommended to the user. The depletion rate also may depend on how many times the user has consumed the content. If the user is consuming self-curated content and/or consuming the same content repetitively, the amount of content or time allotted to the user may undergo more rapid depletion. For example, if the user repeatedly listens to a song in the user's own playlist, allotted time/content will be used at a faster rate than if the user listens to a new song that another user has curated and/or recommended.

In some embodiments, particular time periods (e.g., a user's birthday) and/or particular content (e.g., sponsored content) may not count against the user's content and/or time allotments. To encourage discovery, a sample of the content or a first consumption of the content may not count against the user's content and/or time allotments.

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments disclosed herein may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a gaming console, television display, eBook reader, Personal Digital Assistant (PDA), cell phone, smartphone, or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of types of displays include e-ink, LCD (Liquid Crystal Display), TFT (Thin Film Transistor), TFD (Thin Film Diode), OLED (Organic Light-Emitting Diode), AMOLED (Active-Matrix Organic Light-Emitting Diode), etc.

Displays may also include and/or communicate with an input device (e.g., capacitive, resistive, and/or some other forms of touch screen technology capable of sensing position, direction, and/or force). Other examples of input devices that can be used for a user interface include buttons (e.g., a keypad or keyboard) and pointing devices (e.g., a mouse or stylus).

As another example, a computer may receive input information through speech recognition or in other audible format. Audio input devices may include a microphone, an analog to digital converter (A/D converter), an audio input jack for receiving analog or digital audio from a source, etc.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

A server may be one or more network-connected devices configured to receive and transmit information such as audio/visual content to and from a user device. For example, a "cloud server" may be provided which may not actually be a single server but is a collection of one or more servers acting together as a shared collection of storage and processing resources. Such collection of servers need not all be situated in the same geographic location and may advantageously be spread out across a large area.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All publications, patent applications, patents, and other references mentioned herein are incorporated by reference in their entirety. In particular, this application is related to U.S. patent application Ser. No. 13/834,956, filed on Mar. 15, 2013, and entitled "Systems, Methods and Apparatuses for Facilitating Content Consumption and Sharing Through Geographic and Incentive Based Virtual Networks," which application is incorporated herein by reference in its entirety.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of and" consisting essentially of shall be closed or semi-closed transitional phrases, respectively, as set forth in the United States Patent Office Manual of Patent Examining Procedures, Section 2111.03.

The invention claimed is:

1. A method for running a multiplayer game for a plurality of users including a first user and a second user based on content curation in a system comprising at least one communication interface for communicating information with a plurality of user devices including a first user device used by the first user and a second user device used by the second user, at least one memory for storing processor-executable instructions, and at least one processor communicatively coupled to the at least one communication interface and the at least one memory, the information associated with a graphically simulated multiplayer gaming environment including a plurality of different locations and a plurality of different compositions, the method comprising:

storing, in the at least one memory, a plurality of user profiles to be used in the graphically simulated multiplayer gaming environment, each user profile generated from a user profile generation request having associated user location information;

automatically determining the associated user location information for each user profile from at least one of an Internet Protocol (IP) address, a Media Access Control (MAC) address, a radio-frequency identification (RFID), a Wi-Fi connection location, a satellite navigation position, and a Cell ID;

storing, in the at least one memory, a plurality of playlists to be shared in the graphically simulated multiplayer gaming environment, each playlist generated from a playlist generation request having associated user profile information and associated playlist composition information such that each playlist is electronically linked to a corresponding user profile based on the associated user profile information and specifies at least one composition of a plurality of different compositions based on the associated playlist composition information;

generating, via the at least one processor, a first graphical display including a map representing at least a subset of the plurality of different locations and at least a first user icon associated with the first user, the first user icon occupying a first location of at least the subset of the plurality of different locations based on first associated user location information and electronically linking the first graphical display to a first user profile of the plurality of user profiles and any corresponding playlists of the plurality of playlists based on the first associated user profile information; and transmitting, via the at least one communication interface, first information associated with the first graphical display to at least the second user device to facilitate rendering of the first graphical display on at least the second user device.

2. The method of claim 1, further comprising assigning, via the at least one processor, an amount of points to the first user profile of the plurality of user profiles, the amount of points based on at least one of:

(A) a selection, by the second user of the second user device, of at least one composition specified in at least one playlist electronically linked to the first user profile;

(B) a deselection, by the second user of the second device, of the at least one composition specified in the at least one playlist electronically linked to the first user profile;

(C) a copy operation, by the second user of the second device, to specify at least one composition from the at least one playlist electronically linked to the first user profile in a different playlist electronically linked to a different user profile of the plurality of user profiles; and (D) a recommendation command, made by the second user of the second device, to recommend at least one composition from the at least one playlist electronically linked to the first user profile.

3. The method of claim 1, further comprising ranking, via the at least one processor, at least a subset of the plurality of user profiles in at least some of the plurality of different locations based on an amount of points assigned to each user profile relative to a total amount of points assigned to at least the subset of the plurality of user profiles.

4. The method of claim 1, wherein a graphical property of the first user icon is determined based on an amount of points assigned to the first user profile, the graphical property being at least one of a color, a lighting effect, a size, and a shape of the first user icon.

5. The method of claim 1, further comprising ranking, via the at least one processor, at least a subset of the plurality of different compositions in at least some of the plurality of different locations based on at least one of:

(A) a number of composition selections, made by the at least one user device plurality of user devices, of each composition relative to the total amount of composition selections by the at least one user device plurality of user devices of at least the subset of the plurality of different compositions;

(B) a number of composition deselections, made by the at least one user device plurality of user devices, of each composition relative to the total amount of composition deselections by the at least one user device plurality of user devices of at least the subset of the plurality of different compositions;

(C) a number of composition copy operations, made by the at least one user device plurality of user devices, to specify each composition from a first one playlist electronically linked to a first corresponding user profile of the plurality of user profiles in a different playlist electronically linked to a different user profile of the plurality of user profiles; and (D) a number of recommendation commands, made by the at least one user device plurality of user devices, to recommend each composition.

6. The method of claim 1, further comprising:

receiving, via the at least one communication interface, a new user profile generation request from a new user device, the new user profile generation request identifying a new user profile to be used in the graphically simulated multiplayer gaming environment, the new user profile generation request having new associated user location information;

generating, via the at least one processor, and storing, in the at least one memory, the new user profile;

generating, via the at least one processor, a second graphical display including a new user icon occupying a new location of at least the subset of the plurality of different locations based on the new associated user location information, the new user icon electronically linking the second graphical display to the new user profile; and transmitting, via the at least one communication interface, second information associated with the second graphical display to at least the second user device to facilitate rendering of the second graphical display on at least the second user device.

7. The method of claim 1, further comprising:

receiving, via the at least one communication interface, a new playlist generation request from the first user device, the new playlist generation request identifying a new playlist to be shared in the graphically simulated multiplayer gaming environment, the new playlist generation request having the first associated user profile information and associated new playlist composition information;

generating, via the at least one processor, and storing, in the at least one memory, the new playlist specifying at least one composition of the plurality of different compositions based on the associated new playlist composition information;

generating, via the at least one processor, a second graphical display including an indication of the new playlist electronically linking the second graphical display to the new playlist; and transmitting, via the at least one communication interface, second information associated with the second graphical display to at least the second user device to facilitate rendering of the second graphical display on at least the second user device.

8. The method of claim 1, further comprising:

receiving, via the at least one communication interface, a map navigation command indicating that the second user device has selected at least a portion of the plurality of different locations on the map;

generating, via the at least one processor, a second graphical display including at least the portion of the plurality of different locations on the map; and transmitting, via the at least one communication interface, second information associated with the second graphical display to at least the second user device to facilitate rendering of the second graphical display on at least the second user device.

9. The method of claim 8, wherein the second graphical display depicts at least one of a different level of focus and a different subset of locations than the first graphical display.

10. The method of claim 1, further comprising:

receiving, via the at least one communication interface, a spin request from the second user device, the spin request identifying at least one of a content category input and a geographical input;

generating, via the at least one processor, and storing, in the at least one memory, a spin playlist specifying at least one composition of the plurality of different compositions based on at least one of the content category input and the geographical input;

generating, via the at least one processor, a second graphical display including an indication of the spin playlist electronically linking the second graphical display to the spin playlist; and transmitting, via the at least one communication interface, second information associated with the second graphical display to at least the second user device to facilitate rendering of the second graphical display on at least the second user device.

11. The method of claim 1, further comprising:

receiving, via the at least one communication interface, a user icon selection command indicating that the second user device has selected the first user icon electronically linking the first graphical display to the first user profile of the plurality of user profiles;

generating, via the at least one processor, a second graphical display including a first graphical indication electronically linking the second graphical display to a first playlist electronically linked to the first user profile; and transmitting, via the at least one communication interface, second information associated with the second graphical display to at least the second user device to facilitate rendering of the second graphical display on at least the second user device.

12. The method of claim 11, further comprising:

receiving, via the at least one communication interface, a playlist selection command indicating that the second user device has selected the first graphical indication electronically linking the second graphical display to the first playlist electronically linked to the first user profile of the plurality of user profiles;

generating, via the at least one processor, a third graphical display including a second graphical indication electronically linking the third graphical display to a first composition specified by the first playlist electronically linked to the first user profile; and transmitting, via the at least one communication interface, third information associated with the third graphical display to at least the second user device to facilitate rendering of the third graphical display on at least the second user device.

13. The method of claim 12, further comprising:

receiving, via the at least one communication interface, a recommendation command indicating that the second user device associated with a second user profile has recommended a composition for the first playlist electronically linked to the first user profile of the plurality of user profiles;

assigning, via the at least one processor, an amount of points to the second user profile based on the recommendation command;

generating, via the at least one processor, a fourth graphical display including a third graphical indication electronically linking the fourth graphical display to the recommended composition; and transmitting, via the at least one communication interface, fourth information associated with the fourth graphical display to at least the second user device to facilitate rendering of the fourth graphical display on at least the second user device.

14. The method of claim 12, further comprising:
receiving, via the at least one communication interface, at least one of:
(A) a composition selection command indicating that the second user device has selected the second graphical indication electronically linking the third graphical display to the first composition specified by the first playlist electronically linked to the first user profile;
(B) a composition deselection command indicating that the second user device has deselected the second graphical indication electronically linking the third graphical display to the first composition specified by the first playlist electronically linked to the first user profile; and
(C) a composition copy command indicating that the second user device has specified the first composition in a second playlist electronically linked to a second user profile; and
assigning, via the at least one processor, an amount of points to the first user profile based on the at least one of (A), (B), and (C).

15. The method of claim 1, further comprising:
receiving, via the at least one communication interface, a composition push command indicating that the second user device associated with a second user profile of the plurality of user profiles has pushed a composition into a first playlist electronically linked to the first user profile such that the first playlist specifies the composition for a time period;
if an amount of points is to be assigned to the first user profile based on the composition during the time period, assigning, via the at least one processor, a first portion of the amount of points to the first user profile and a second portion of the amount of points to the second user profile.

16. The method of claim 1, wherein the plurality of different compositions include at least one of recorded speech, an image, a music recording, and a video recording.

17. The method of claim 1, wherein the first user icon is represented by a virtual world object.

18. The method of claim 17, wherein the virtual world object includes at least one of a building and a vehicle.

19. The method of claim 1, wherein the map includes at least one of:
a virtual world boundary representing a real world boundary; and
a virtual world landmark representing a real world landmark.

20. The method of claim 1, wherein the first user profile of the plurality of user profiles at least one of pays and plays to activate a mass composition push command for a time period such that the first user device associated with the first user profile pushes a composition into at least one playlist of the plurality of playlists, the first user profile electronically linked to the first user icon, at least one of the location and rank of the first user icon determining a radius including at least one other user icon, the at least one other user icon electronically linked to at least one other user profile, the at least one other user profile corresponding to the at least one playlist, and at least a portion of any amount of points to be assigned to the at least one other user profile based on the composition during the time period is assigned to the first user profile.

21. The method of claim 1, wherein the plurality of user profiles includes at least one advertiser profile, and the at least one advertiser profile pays for a watermark to advertise over at least a portion of the map for a time period, the portion of the map including at least one of:
a grid tile in at least one grid plane representing each location of the plurality of different locations;
an area enclosed by at least one virtual world boundary representing a real world boundary; and
a virtual world landmark representing a real world landmark.

22. The method of claim 1, wherein the plurality of user profiles includes at least one advertiser profile, the at least one advertiser profile pays for a virtual world object to advertise on the map for a time period.

23. The method of claim 22, wherein the virtual world object includes at least one of:
a building;
a vehicle; and
a boat located in virtual body of water representing a real world body of water.

24. A method for running a multiplayer game for a plurality of users including a first user and a second user based on content curation in a system comprising at least one communication interface for communicating information with a plurality of user devices including a first user device used by the first user and a second user device used by the second user, at least one memory for storing processor-executable instructions, and at least one processor communicatively coupled to the at least one communication interface and the at least one memory, the information associated with a graphically simulated multiplayer gaming environment including a plurality of different locations and a plurality of different compositions, the method comprising:
storing, in the at least one memory, a plurality of user profiles to be used in the graphically simulated multiplayer gaming environment, each user profile generated from a user profile generation request having associated user location information;
automatically determining the associated user location information for each user profile from at least one of an Internet Protocol (IP) address, a Media Access Control (MAC) address, a radio-frequency identification (RFID), a Wi-Fi connection location, a satellite navigation position, and a Cell ID;
storing, in the at least one memory, a plurality of playlists to be shared in the graphically simulated multiplayer gaming environment, each playlist generated from a playlist generation request having associated user profile information and associated playlist composition information such that each playlist is electronically linked to a corresponding user profile based on the associated user profile information and specifies at least one composition of a plurality of different compositions based on the associated playlist composition information;
generating, via the at least one processor, a first graphical display including a map representing at least a subset of the plurality of different locations and at least a first user icon associated with the first user, the first user icon occupying a first location of at least the subset of the plurality of different locations based on first associated user location information and electronically linking the first graphical display to a first user profile of the plurality of user profiles and any corresponding playlists of the plurality of playlists based on the first associated user profile information;

transmitting, via the at least one communication interface, first information associated with the first graphical display to at least the second user device to facilitate rendering of the first graphical display on at least the second user device;

receiving, via the at least one communication interface, a map navigation command indicating that the second user device has selected at least a portion of the plurality of different locations on the map;

generating, via the at least one processor, a second graphical display including at least the portion of the plurality of different locations on the map;

transmitting, via the at least one communication interface, second information associated with the second graphical display to at least the second user device to facilitate rendering of the second graphical display on at least the second user device; and assigning, via the at least one processor, an amount of points to the first user profile of the plurality of user profiles, the amount of points based on at least one of:
(A) a selection, by the second user of the second user device, of at least one composition specified in at least one playlist electronically linked to the first user profile;
(B) a deselection, by the second user of the second device, of the at least one composition specified in the at least one playlist electronically linked to the first user profile;
(C) a copy operation, by the second user of the second device, to specify at least one composition from the at least one playlist electronically linked to the first user profile in a different playlist electronically linked to a different user profile of the plurality of user profiles; and
(D) a recommendation command, made by the second user of the second device, to recommend at least one composition from the at least one playlist electronically linked to the first user profile.

25. A method for running a multiplayer game for a plurality of users including a first user and a second user based on content curation in a system comprising at least one communication interface for communicating information with at least one user device with a plurality of user devices including a first user device used by the first user and a second user device used by the second user, at least one memory for storing processor-executable instructions, and at least one processor communicatively coupled to the at least one communication interface and the at least one memory, the information associated with a graphically simulated multiplayer gaming environment including a plurality of different locations and a plurality of different compositions, the method comprising:

storing, in the at least one memory, a plurality of user profiles to be used in the graphically simulated multiplayer gaming environment, each user profile generated from a user profile generation request having associated user location information;

automatically determining the associated user location information for each user profile from at least one of an Internet Protocol (IP) address, a Media Access Control (MAC) address, a radio-frequency identification (RFID), a Wi-Fi connection location, a satellite navigation position, and a Cell ID;

storing, in the at least one memory, a plurality of playlists to be shared in the graphically simulated multiplayer gaming environment, each playlist generated from a playlist generation request having associated user profile information and associated playlist composition information such that each playlist is electronically linked to a corresponding user profile based on the associated user profile information and specifies at least one composition of a plurality of different compositions based on the associated playlist composition information;

generating, via the at least one processor, a first graphical display including a map representing at least a subset of the plurality of different locations and at least a first user icon associated with the first user, the first user icon occupying a first location of at least the subset of the plurality of different locations based on first associated user location information and electronically linking the first graphical display to a corresponding first user profile of the plurality of user profiles and any corresponding playlists of the plurality of playlists based on the first associated user profile information;

transmitting, via the at least one communication interface, first information associated with the first graphical display to at least the second user device to facilitate rendering of the first graphical display on at least the second user device;

receiving, via the at least one communication interface, a user icon selection command indicating that the second user device has selected the first user icon electronically linking the first graphical display to the first user profile of the plurality of user profiles;

generating, via the at least one processor, a second graphical display including a first graphical indication electronically linking the second graphical display to a first playlist electronically linked to the first user profile;

transmitting, via the at least one communication interface, second information associated with the second graphical display to at least the second user device to facilitate rendering of the second graphical display on at least the second user device;

receiving, via the at least one communication interface, a playlist selection command indicating that the second user device has selected the first graphical indication electronically linking the second graphical display to the first playlist electronically linked to the first user profile of the plurality of user profiles;

generating, via the at least one processor, a third graphical display including a second graphical indication electronically linking the third graphical display to a first composition specified by the first playlist electronically linked to the first user profile;

transmitting, via the at least one communication interface, third information associated with the third graphical display to at least the second user device to facilitate rendering of the third graphical display on at least the second user device;

receiving, via the at least one communication interface, a recommendation command indicating that the second user device associated with a second user profile has recommended a composition for the first playlist electronically linked to the first user profile of the plurality of user profiles;

assigning, via the at least one processor, an amount of points to the second user profile based on the recommendation command;

generating, via the at least one processor, a fourth graphical display including a third graphical indication electronically linking the fourth graphical display to the recommended composition; and transmitting, via the at least one communication interface, fourth information associated with the fourth graphical display to at least the second user device to facilitate rendering of the fourth graphical display on at least the second user device, wherein:

the plurality of different compositions include at least one of recorded speech, an image, a music recording, and a video recording;

the first user icon is represented by a virtual world object; and the virtual world object is a house includes at least one of a building and a vehicle.

* * * * *